US012502797B2

(12) United States Patent
Laschinski et al.

(10) Patent No.: US 12,502,797 B2
(45) Date of Patent: Dec. 23, 2025

(54) HAIR CUTTING KIT

(71) Applicant: Braun GmbH, Kronberg (DE)

(72) Inventors: Gerd Laschinski, Oberursel (DE); Markus Schuessler, Koenigstein (DE); Simone Langwasser, Bad Homburg (DE); Joachim Krauss, Seeheim-Jugenheim (DE)

(73) Assignee: Braun GMBH, Kronberg (DE)

( * ) Notice: Subject to any disclaimer, the term of this patent is extended or adjusted under 35 U.S.C. 154(b) by 605 days.

(21) Appl. No.: 17/850,800

(22) Filed: Jun. 27, 2022

(65) Prior Publication Data

US 2022/0410419 A1 Dec. 29, 2022

(30) Foreign Application Priority Data

Jun. 28, 2021 (EP) .................................... 21182057

(51) Int. Cl.
*B26B 19/38* (2006.01)
*B26B 19/06* (2006.01)
*B26B 19/20* (2006.01)

(52) U.S. Cl.
CPC ........ *B26B 19/3826* (2013.01); *B26B 19/063* (2013.01); *B26B 19/20* (2013.01); *B26B 19/38* (2013.01); *B26B 19/3813* (2013.01); *B26B 19/3853* (2013.01); *B26B 19/386* (2013.01)

(58) Field of Classification Search
CPC ......... B26B 19/02; B26B 19/04; B26B 19/06; B26B 19/063; B26B 19/20; B26B 19/205; B26B 19/38; B26B 19/3806; B26B 19/3813; B26B 19/3826; B26B 19/3853
See application file for complete search history.

(56) References Cited

U.S. PATENT DOCUMENTS 2,747,277 A * 5/1956 Esposito ................. B26B 19/20 30/200
3,008,233 A * 11/1961 Waggoner ........... B26B 19/3813 30/537
3,030,707 A * 4/1962 Garvey ............... B26B 19/3813 30/537
3,287,805 A * 11/1966 Du Charme ............ B26B 19/20 30/41.5
3,648,370 A * 3/1972 Cercone .................. B26B 19/20 30/201

(Continued)

FOREIGN PATENT DOCUMENTS

CN 119730998 A * 3/2025 ............. B26B 19/06
EP 1935586 A1 6/2008

(Continued)

OTHER PUBLICATIONS

Extended EP Search Report and Written Opinion for 21182057.6-1004 dated Nov. 12, 2021, 07 pages.

*Primary Examiner* — Jason Daniel Prone
(74) *Attorney, Agent, or Firm* — Gerd Zetterer

(57) ABSTRACT

A hair cutting kit includes a handle, a first trimmer head for releasable attachment to the handle, a second trimmer head for releasable attachment to the handle, and a comb implement including at least one row of comb teeth. A mechanical interface is provided for releasable attachment of the comb implement to the first trimmer head and for releasable attachment of the comb implement to the second trimmer head.

19 Claims, 9 Drawing Sheets

(56) References Cited

U.S. PATENT DOCUMENTS 3,651,570 A * 3/1972 Groves ................... B26B 19/20 30/233
4,348,810 A * 9/1982 Oda ........................ B26B 19/20 30/200
4,614,036 A * 9/1986 Haraguchi ............ B26B 19/205 30/200
4,622,745 A * 11/1986 Wahl ....................... B26B 19/20 30/201
5,054,199 A * 10/1991 Ogawa .................... B26B 19/06 30/200
5,084,974 A * 2/1992 Sukow .................... B26B 19/20 30/233
5,105,541 A * 4/1992 Messinger .............. B26B 19/20 30/200
5,185,931 A * 2/1993 Fujikawa ................ B26B 19/20 30/201
5,579,581 A * 12/1996 Melton ............... B26B 19/3813 30/223
6,079,103 A * 6/2000 Melton ................... B26B 19/20 30/79
6,125,545 A * 10/2000 Yamaguchi ............. B26B 19/20 30/233.5
6,378,210 B1 4/2002 Bickford
6,604,287 B2 * 8/2003 Melton ............... B26B 19/3853 30/125
6,618,948 B2 * 9/2003 Lin ......................... B26B 19/20 30/233.5
6,807,736 B2 * 10/2004 Langley .................. B26B 19/20 30/123
7,188,422 B2 * 3/2007 McCambridge ........ B26B 19/20 30/208
7,367,127 B2 5/2008 Nakakura et al.
7,762,001 B2 * 7/2010 Morisugi ................ B26B 19/06 30/216
7,900,359 B2 * 3/2011 Royle ................... B26B 19/063 30/43.92
7,921,566 B2 4/2011 Yamaguchi et al.
8,302,315 B2 * 11/2012 Ullmann ............. B26B 19/3853 30/45
8,732,964 B2 * 5/2014 Fischer ............... B26B 19/3813 30/526
8,850,707 B2 10/2014 Maichel et al.
10,702,999 B2 * 7/2020 Iaccarino .............. B26B 19/063
10,913,170 B2 * 2/2021 Phoon ...................... B26B 19/20
11,104,017 B2 * 8/2021 Carlucci ............... B26B 19/063
11,364,646 B2 * 6/2022 Iaccarino .............. B26B 19/063
11,465,302 B2 * 10/2022 Streur ................. B26B 19/3813
11,738,474 B2 * 8/2023 Van Veldhuizen ...... B26B 19/20 30/201
11,820,030 B2 * 11/2023 Emminger .............. B26B 19/20
11,919,181 B2 * 3/2024 Van Veldhuizen ........................... B26B 19/3826
12,145,283 B2 * 11/2024 Iaccarino .............. B26B 19/063
2010/0011585 A1 * 1/2010 Maichel .............. B26B 19/3813 30/34.1
2010/0037463 A1 * 2/2010 Maichel .............. B26B 19/3813 30/526
2011/0001672 A1 1/2011 Harihara
2011/0016723 A1 1/2011 Maichel et al.
2011/0214289 A1 * 9/2011 Maichel .................. B26B 19/38 30/29.5
2012/0110859 A1 * 5/2012 Kammer ................. B26B 19/06 30/223
2014/0215832 A1 8/2014 Julemont
2018/0085943 A1 3/2018 Bady et al.
2018/0085949 A1 3/2018 Krauss et al.
2020/0238547 A1 7/2020 Iaccarino
2020/0307004 A1 * 10/2020 Ham ....................... B26B 19/20
2021/0339412 A1 * 11/2021 Van Veldhuizen ........................... B26B 19/3853
2022/0040872 A1 * 2/2022 Pandis ................ B26B 19/3813
2022/0184831 A1 * 6/2022 Mulder ............... B26B 19/3813
2022/0410420 A1 * 12/2022 Reinprecht ............. B26B 19/06
2022/0410421 A1 * 12/2022 Laschinski .......... B26B 19/3813
2023/0286182 A1 * 9/2023 Laschinski .............. B26B 19/20
2023/0356420 A1 * 11/2023 Hoffäller ................. B26B 19/20
2024/0208092 A1 * 6/2024 Chan ....................... B26B 19/06

FOREIGN PATENT DOCUMENTS

EP 2450161 A1 5/2012
EP 4112245 A1 * 1/2023 ......... B26B 19/3853
GB 2294230 A 4/1996
JP H11197373 A 7/1999
JP H11197375 A 7/1999
JP 2023007462 A * 1/2023 ............. B26B 19/38

* cited by examiner

HAIR CUTTING KIT

FIELD OF THE INVENTION

Aspects relate to a hair cutting kit. Aspects relate in particular to a hair cutting kit that comprises a comb implement that can be releasably attached to a cutting unit having a stationary blade.

BACKGROUND OF THE INVENTION

Hair trimmers or hair clippers are used, for example, in professional salons by hair stylists or by private users to trim scalp or beard hair. Another area of application is body grooming, in which the user primarily wishes to achieve an esthetic effect by thoroughly removing hair in other areas of the body, for example in the armpit area, the bikini zone or in intimate areas.

Hair cutting kits provide a greater degree of flexibility of use. For illustration, a handle can be combined with different types of trimmer heads depending on the area of the body in which the user intends to use the device. Versatility and configurability may also be attained by one or several comb implements. When a hair trimmer is used directly on the skin, the hair is cut to a determined by the blade configuration of the trimmer. To achieve longer hair lengths, comb implements may be used.

The use of comb implements may be associated with various challenges. When a hair cutting kit includes various trimmer heads to afford re-configurability (e.g., for beard trimming or for body grooming), a corresponding set of comb implements could be provided, with each comb implement being tailored for use with only one of the trimmer heads. While such an approach allows each one of the comb implements to be tailored to the trimmer head with which it is intended to be used, the provision of several comb implements that are each tailored for one trimmer head only may add to the manufacturing complexity and to the complexity of use of the hair cutting kit. There is a risk that the user combines a comb implement with a trimmer head other than the one for which the comb implement is intended to be used, which adversely affects efficiency of the cutting operation.

Ensuring good cutting efficiency is not only desirable when a comb implement is used in association with a hair cutting kit that includes several replaceable trimmer heads, but also when a comb implement is used in association with only one trimmer head.

It is an objective of the invention to address at least some of the above-mentioned challenges in the art.

SUMMARY OF THE INVENTION

There is a need for enhanced hair cutting kits. There is a need for hair cutting kits that afford use of a comb implement while ensuring good cutting efficiency. Alternatively or additionally, there is a need for hair cutting kits that mitigate the risk that a comb implement is used with a trimmer head in an incorrect manner and/or in a manner which adversely affects cutting efficiency.

According to an aspect, a hair cutting kit comprises a handle, a first trimmer head, a second trimmer head, and a comb implement.

The first trimmer head is configured for reversibly releasable attachment to the handle. The first trimmer head comprises at least one first stationary blade comprising at least one row of first teeth. The at least one row of first teeth extends in a first direction. Adjacent first teeth of the at least one row of first teeth are separated from each other along the first direction by first gaps. Central longitudinal axes of the first teeth are perpendicular to the first direction. The central longitudinal axes of adjacent first teeth are spaced from each other along the first direction by a first pitch.

The second trimmer head is configured for reversibly releasable attachment to the handle. The second trimmer head comprises at least one second stationary blade comprising at least one row of second teeth. The at least one row of second teeth extends in the first direction. Adjacent second teeth of the at least one row of second teeth are separated from each other along the first direction by second gaps. Central longitudinal axes of the second teeth are perpendicular to the first direction. The central longitudinal axes of adjacent second teeth are spaced from each other along the first direction by a second pitch.

The comb implement comprises at least one row of comb teeth. The comb implement may comprise a mechanical interface operative for reversibly releasable attachment of the comb implement to the first trimmer head and for reversibly releasable attachment of the comb implement to the second trimmer head.

The comb implement is configured such that when the comb implement is attached to the first trimmer head or the second trimmer head, the at least one row of comb teeth extends in the first direction, adjacent comb teeth of the at least one row of comb teeth are separated from each other along the first direction by comb tooth gaps, mid-planes of the comb teeth are perpendicular to the first direction, and the mid-planes of adjacent comb teeth are spaced from each other along the first direction by a third pitch.

The third pitch is equal to the first pitch multiplied by a first integer. The third pitch is equal to the second pitch multiplied by a second integer different from the first integer.

A hair cutting kit according to another aspect comprises a handle, a trimmer head, and a comb implement.

The trimmer head is attached or releasably attachable to the handle. The trimmer head comprises at least one stationary blade comprising at least one row of blade teeth, wherein the at least one row of blade teeth extends along a first direction, the blade teeth have central longitudinal axes perpendicular to the first direction, and adjacent blade teeth are separated from each other along the first direction by gaps.

The comb implement comprises at least one row of comb teeth. The comb implement is configured for reversibly releasable attachment to the trimmer head or the handle. The comb implement is configured such that, when the comb implement is attached to the trimmer head or the handle, the at least one row of comb teeth extends in the first direction, adjacent comb teeth are separated by comb tooth gaps, and some, a majority, or all of the comb teeth overlap at least part of at least some of the gaps between adjacent blade teeth.

The comb implement may be configured such that, when the comb implement is attached, mid-planes of some, a majority, or all of the comb teeth are aligned with mid-planes of at least some of the gaps between adjacent blade teeth, wherein the mid-planes of the comb teeth and the mid-planes of the gaps are perpendicular to the first direction.

According to an aspect, a hair cutting kit comprises a handle, a first trimmer head, and a second trimmer head.

The first trimmer head is configured for reversibly releasable attachment to the handle. The first trimmer head comprises at least one first stationary blade comprising at least one row of first teeth. The at least one row of first teeth extends in a first direction. Adjacent first teeth of the at least one row of first teeth are separated from each other along the first direction by first gaps. Central longitudinal axes of the first teeth are perpendicular to the first direction. The central longitudinal axes of adjacent first teeth are spaced from each other along the first direction by a first pitch.

The second trimmer head is configured for reversibly releasable attachment to the handle. The second trimmer head comprises at least one second stationary blade comprising at least one row of second teeth. The at least one row of second teeth extends in the first direction. Adjacent second teeth of the at least one row of second teeth are separated from each other along the first direction by second gaps. Central longitudinal axes of the second teeth are perpendicular to the first direction. The central longitudinal axes of adjacent second teeth are spaced from each other along the first direction by a second pitch.

According to an aspect, a method of using a comb implement of a hair cutting kit is provided. The hair cutting kit comprises a handle, a first trimmer head, a second trimmer head, and the comb implement. The method comprises selectively releasably engaging the comb implement with a first trimmer head or with a second trimmer head.

The first trimmer head is configured for reversibly releasable attachment to the handle. The first trimmer head comprises at least one first stationary blade comprising at least one row of first teeth. The at least one row of first teeth extends in a first direction. Adjacent first teeth of the at least one row of first teeth are separated from each other along the first direction by first gaps. Central longitudinal axes of the first teeth are perpendicular to the first direction. The central longitudinal axes of adjacent first teeth are spaced from each other along the first direction by a first pitch.

The second trimmer head is configured for reversibly releasable attachment to the handle. The second trimmer head comprises at least one second stationary blade comprising at least one row of second teeth. The at least one row of second teeth extends in the first direction. Adjacent second teeth of the at least one row of second teeth are separated from each other along the first direction by second gaps. Central longitudinal axes of the second teeth are perpendicular to the first direction. The central longitudinal axes of adjacent second teeth are spaced from each other along the first direction by a second pitch.

The comb implement comprises at least one row of comb teeth. The comb implement may comprise a mechanical interface operative for reversibly releasable attachment of the comb implement to the first trimmer head and for reversibly releasable attachment of the comb implement to the second trimmer head.

The comb implement is configured such that when the comb implement is attached to the first trimmer head or the second trimmer head, the at least one row of comb teeth extends in the first direction, adjacent comb teeth of the at least one row of comb teeth are separated from each other along the first direction by comb tooth gaps, mid-planes of the comb teeth are perpendicular to the first direction, and the mid-planes of adjacent comb teeth are spaced from each other along the first direction by a third pitch.

The third pitch is equal to the first pitch multiplied by a first integer. The third pitch is equal to the second pitch multiplied by a second integer different from the first integer.

Various effects are attained. The hair cutting kit allows hairs to be efficiently guided to a cutting unit that includes the stationary blade, while mitigating the risk of incorrect use of a comb implement.

DETAILED DESCRIPTION OF THE INVENTION

Figure 1:
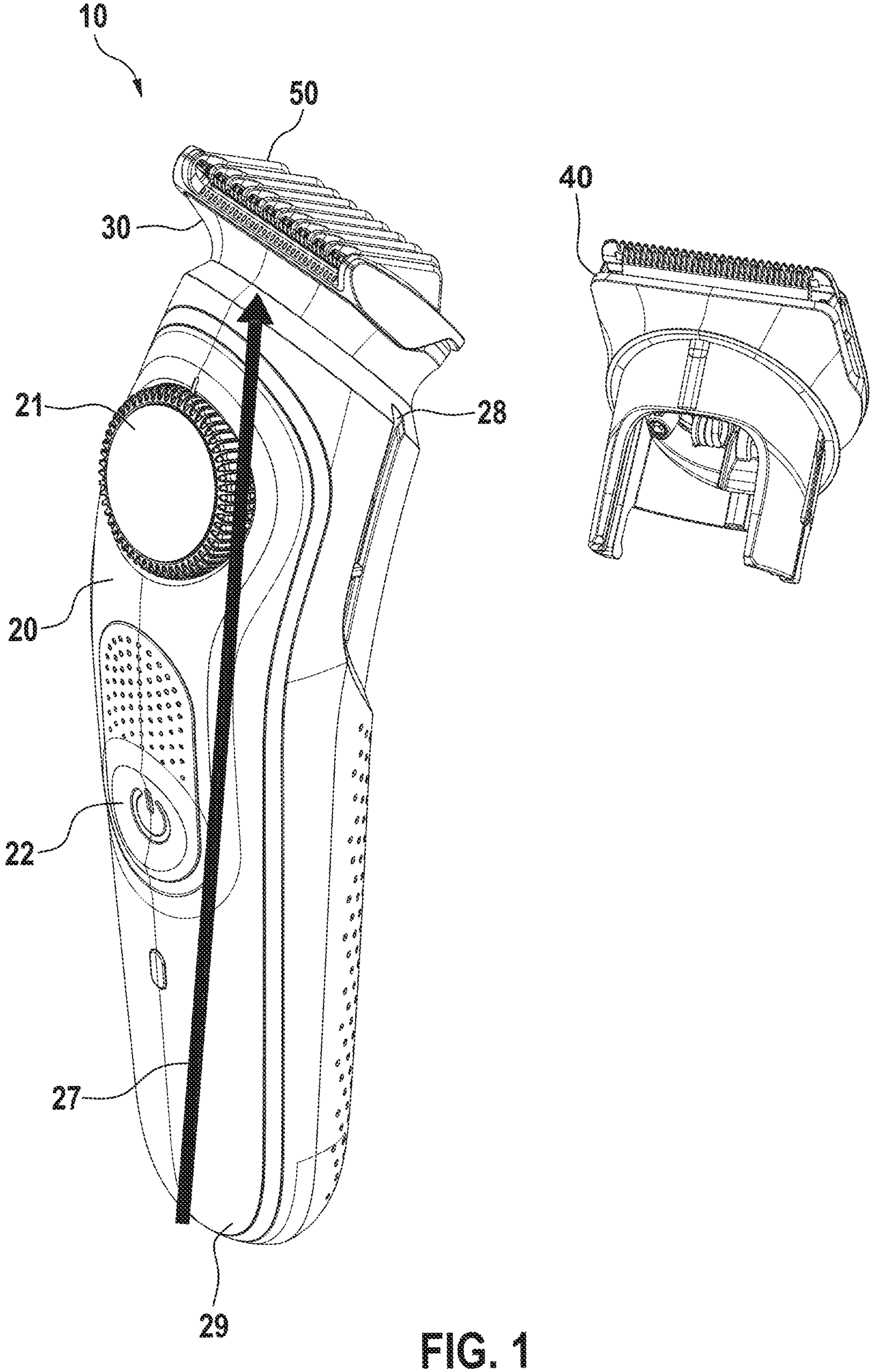
FIG. 1 is a view of a hair cutting kit.

Aspects will be described with reference to the drawings in which similar or identical reference numerals designate features or elements that are similar or identical in construction, operation, and/or function.

Aspects relate to hair cutting kits. The hair cutting kit may comprise a handle, a combination of different trimmer heads having different tooth pitches, and one, two, or more comb implements. The comb implement(s) is/are configured to function efficiently on different trimmer heads despite the different tooth pitches of the different trimmer heads.

According to an aspect, a hair cutting kit comprises a handle, a first trimmer head, a second trimmer head, and a comb implement. The first trimmer head is configured for reversibly releasable attachment to the handle. The first trimmer head comprises at least one first stationary blade comprising at least one row of first teeth. The at least one row of first teeth extends in a first direction. Adjacent first teeth of the at least one row of first teeth are separated from each other along the first direction by first gaps. Central longitudinal axes of the first teeth are perpendicular to the first direction. The central longitudinal axes of adjacent first teeth are spaced from each other along the first direction by a first pitch. The second trimmer head is configured for reversibly releasable attachment to the handle. The second trimmer head comprises at least one second stationary blade comprising at least one row of second teeth. The at least one row of second teeth extends in the first direction. Adjacent second teeth of the at least one row of second teeth are separated from each other along the first direction by second gaps. Central longitudinal axes of the second teeth are perpendicular to the first direction. The central longitudinal axes of adjacent second teeth are spaced from each other along the first direction by a second pitch. The comb implement comprises at least one row of comb teeth. The comb implement may comprise a mechanical interface operative for reversibly releasable attachment of the comb implement to the first trimmer head and for reversibly releasable attachment of the comb implement to the second trimmer head. The comb implement is configured such that when the comb implement is attached to the first trimmer head or the second trimmer head, the at least one row of comb teeth extends in the first direction, adjacent comb teeth of the at least one row of comb teeth are separated from each other along the first direction by comb tooth gaps, mid-planes of the comb teeth are perpendicular to the first direction, and the mid-planes of adjacent comb teeth are spaced from each other along the first direction by a third pitch. The third pitch is equal to the first pitch multiplied by a first integer. The third pitch is equal to the second pitch multiplied by a second integer different from the first integer.

The hair cutting kit according to this aspects allows hairs to be efficiently guided to a cutting unit that includes the stationary blade, irrespective of whether the comb implement is used in association with the first trimmer head or with the second trimmer head.

A ratio of the first integer divided by the second integer may be 0.3 or more and/or 3.0 or less. A ratio of the first integer divided by the second integer may be 0.5 or more and/or 2.0 or less. These ratios allow one of the trimmer heads to have a pitch for, e.g., body grooming or other use in areas where the skin is more likely to be cut, while the other one of the trimmer heads can have a pitch for, e.g., cutting beard or scalp hair. These ratios of first and second pitch also lend themselves to the comb teeth being aligned with blade tooth gaps and/or blade teeth of the first and second trimmer heads in a manner that provides adequate protection for the skin without severely compromising cutting efficacy.

The first integer and the second integer may differ from each other by 1 or 2. The first integer and the second integer may be greater than 1. The first integer and the second integer may be 5 or smaller. These pitch ratios allow the comb teeth being aligned with blade tooth gaps and/or blade teeth of the first and second trimmer heads in a manner that provides adequate protection for the skin without severely compromising cutting efficacy.

The second pitch may be smaller than the first pitch. The second trimmer head is then particularly suitable for use in body areas where the skin is flexible (such as the intimate area), affording reconfigurability between body grooming and beard or scalp hair trimming.

Each of the comb teeth may be substantially mirror-symmetric relative to its mid-plane. Each of the comb teeth may have a tip, when viewed in a viewing direction that is perpendicular to the first direction and the central longitudinal axes of the first or second teeth, and the mid-plane of each comb tooth may pass through its tip. The tip of a comb tooth may be arranged at a frontmost edge of the device assembled from the handle, one of the trimmer heads, and the comb implement, with the frontmost edge being the frontmost part of a skin abutment surface in an operative movement direction. Such configurations allow the comb teeth to efficiently guide hairs towards the cutting unit while affording ease of manufacture.

Each of the comb teeth may extend along its mid-plane from a comb tooth base to a free comb tooth end.

The comb implement may be configured such that, when the comb implement is attached to the second trimmer head, some, a majority, or all of the comb teeth overlap associated second gaps between adjacent second teeth. The comb implement may be configured such that, when the comb implement is attached to the second trimmer head, some, a majority, or all of the comb teeth may be arranged in an overlapping relationship with associated second gaps when viewed in a viewing direction that is perpendicular to the first direction and the central longitudinal axes of the second teeth. Such configurations take advantage of the fact that, surprisingly, cutting efficiency can be increased by arranging the comb teeth in overlapping relationship with blade tooth gaps, in particular when the pitch between blade teeth is comparatively small.

The comb implement may be configured such that, when the comb implement is attached to the second trimmer head, at least some of the second gaps are not being overlapped by any of the comb teeth. The comb implement may be configured such that, when the comb implement is attached to the second trimmer head, at least some of the second gaps are not being overlapped by any of the comb teeth when viewed in a viewing direction that is perpendicular to the first direction and the central longitudinal axes of the second teeth. The comb implement may be configured such that, when the comb implement is attached to the second trimmer head, comb teeth overlap every $L^{th}$ second gap, where L is a positive integer that is 2, 3, or greater than 3. Such configurations take advantage of the fact that, surprisingly, cutting efficiency can be increased by arranging the comb teeth in overlapping relationship with some blade tooth gaps while leaving other gaps between blade teeth unobstructed. This is particularly useful when the pitch between blade teeth is comparatively small.

The second gaps may have mid-planes that are perpendicular to the first direction. The mid-planes of the second gaps may be arranged centrally between tips of adjacent second teeth. The comb implement may be configured such that, when the comb implement is attached to the second trimmer head, the mid-planes of some, a majority, or all of the comb teeth are aligned with the mid-planes of the second gaps. The comb implement may be configured such that, when the comb implement is attached to the second trimmer head, the mid-planes of some, a majority, or all of the comb teeth coincide with mid-planes of the second gaps. Such configurations take advantage of the fact that, surprisingly, cutting efficiency can be increased by arranging the comb teeth in overlapping relationship with some blade tooth gaps while leaving other gaps between blade teeth unobstructed. This is particularly useful when the pitch between blade teeth is comparatively small.

The comb implement may be configured such that, when the comb implement is attached to the second trimmer head, some, a majority, or all of the comb teeth are aligned with associated second teeth. The comb implement may be configured such that, when the comb implement is attached to the second trimmer head, the mid-planes of some, a majority, or all of the comb teeth are aligned with the central longitudinal axes of associated second teeth. The comb implement may be configured such that, when the comb implement is attached to the second trimmer head, the central longitudinal axes of some of the second teeth extend along the mid-planes of some, a majority, or all of the comb teeth. Such configurations take advantage of the fact that, if the comb tooth width of a comb tooth does not significantly occlude second gaps that are adjacent the blade tooth with which the comb tooth is aligned, hair can be guided efficiently also into gaps of the stationary blade of the second trimmer head that are adjacent the tooth of the stationary blade with which a comb tooth is aligned.

The comb implement may be configured such that, when the first trimmer head is attached to the handle and the comb implement is attached to the first trimmer head, some, a majority, or all of the comb teeth overlap associated first teeth. The comb implement may be configured such that, when the comb implement is attached to the first trimmer head, the mid-planes of some, a majority, or all of the comb teeth are aligned with the central longitudinal axes of associated first teeth. The comb implement may be configured such that, when the comb implement is attached to the first trimmer head, some, a majority, or all of the first gaps are not or only partially being overlapped by any of the comb teeth. The comb implement may be configured such that, when the comb implement is attached to the first trimmer head, some, a majority, or all of the first gaps are not or only partially being overlapped by any of the comb teeth when viewed in a viewing direction that is perpendicular to the first direction and the central longitudinal axes of the first teeth. Such configurations take advantage of the fact that, if the comb tooth width of a comb tooth does not significantly occlude first gaps that are adjacent the blade tooth with which the comb tooth is aligned, hair can be guided efficiently also into gaps of the stationary blade of the first trimmer head that are adjacent the tooth of the stationary blade with which a comb tooth is aligned. This applies in particular when the first trimmer head has stationary blade teeth with a pitch that is greater than that of the second trimmer head blade.

Each comb tooth may have a J-shaped portion. The comb implement may be configured such that, when the comb implement is attached to the first or second trimmer head, the J-shaped portion curves around the first direction. The comb implement may be configured such that, when the comb implement is attached to the first or second trimmer head, the J-shaped portion extends out of a plane that is parallel to a plane spanned by the first direction and the central longitudinal axes of the first or second teeth. The J-shaped portion may have a width measured along the first direction that is smaller than the first pitch and/or the second pitch. The width of the J-shaped portion may be a distance between two tangential planes that are tangential to opposite flank surfaces of the J-shaped portion, wherein the two tangential planes are spaced along the first direction by the comb tooth width. Such configurations afford efficient guiding of hairs towards the blades of the respective trimmer head.

The width of the J-shaped portion may be greater than or smaller than a tooth width of the first teeth.

The first trimmer head may comprise a first movable blade arranged for reciprocating movement relative to the first stationary blade. The first teeth of the first stationary blade may have a cutting edge. Teeth of the first movable blade may have another cutting edge. The first trimmer head may be operative for scissor cutting of hairs arranged between the cutting edge of the first teeth of the first stationary blade and the other cutting edge of the teeth of the first movable blade. Such configurations facilitate efficient cutting by means of scissors cutting when the first trimmer head is assembled to the handle.

The second trimmer head may comprise a second movable blade arranged for reciprocating movement relative to the second stationary blade. The second teeth of the second stationary blade may have a cutting edge. Teeth of the second movable blade may have another cutting edge. The second trimmer head may be operative for scissor cutting of hairs arranged between the cutting edge of the second teeth of the second stationary blade and the other cutting edge of the teeth of the second movable blade. Such configurations facilitate efficient cutting by means of scissors cutting when the first trimmer head is assembled to the handle.

The mechanical interface of the comb implement may comprise an engagement structure operative for reversibly releasable engagement with engagement structures of the first trimmer head and the second trimmer head. Such configurations allow the comb implement to be securely mounted on either one of the first and second trimmer heads, while facilitating a reconfiguration in which one trimmer head is replaced by the other one (e.g., to reconfigure the device for use as a body groomer after it has been used for beard or scalp hair trimming or vice versa).

The first trimmer head may have a mating engagement structure operative for reversibly releasable engagement with the mechanical interface of the comb implement. The second trimmer head may have a mating engagement structure operative for reversibly releasable engagement with the mechanical interface of the comb implement. The first trimmer head may have a first handle interface operative for reversibly releasable engagement with the handle. The second trimmer head may have a second handle interface operative for reversibly releasable engagement with the handle. Such configurations facilitate a reconfiguration in which one trimmer head is replaced by the other one (e.g., to reconfigure the device for use as a body groomer after it has been used for beard or scalp hair trimming or vice versa).

The handle may comprise an electric motor having a motor shaft and a drive element coupled to or integral with the motor shaft, the drive element being operative to drive a driven element to drive a movable blade. The handle may comprise a rechargeable battery. These features add to user comfort.

The hair cutting kit may further comprise at least one additional comb implement. The at least one additional comb implement comprises at least one row of additional comb teeth. The at least one additional comb implement may comprise a mechanical interface operative for reversibly releasable attachment of the comb implement to the first trimmer head and for reversibly releasable attachment of the comb implement to the second trimmer head. The at least one additional comb implement is configured such that when the at least one additional comb implement is attached to the first trimmer head or the second trimmer head, the at least one row of additional comb teeth extends in the first direction, adjacent additional comb teeth of the at least one row of additional comb teeth are separated from each other along the first direction by additional comb tooth gaps, mid-planes of the additional comb teeth are perpendicular to the first direction, and the mid-planes of adjacent additional comb teeth are spaced from each other along the first direction by the third pitch. The additional comb teeth of the at least one additional comb implement may have a width measured parallel to the first direction and/or a height measured perpendicular to a plane spanned by the first direction and the central longitudinal axes of the teeth of the first or second trimmer head that is distinguished form the comb teeth of the comb implement. Such configurations allow the at least one additional comb implement to be readily used with both the first trimmer head and the second trimmer head. The comb implement and the additional comb implement(s) may be used to set different cutting heights, for example.

The first pitch may be 1 mm or more, 1.5 mm or more, 1.6 mm or more, or 1.7 mm or more. The second pitch may be 1.5 mm or less, 1.2 mm or less, 1.15 mm or less, or 1.13 mm or less. The third pitch may be 2 mm or more, 2.5 mm or more, 3 mm or more, 3.2 mm or more, or 3.4 mm or more.

Such pitches are suitable for affording use of the hair cutting kit for beard and scalp hair trimming and for body grooming.

The first direction along which blade teeth and comb teeth are arranged may be determined as a line interconnecting tips of outermost first teeth arranged on opposite ends of the row of first teeth, a line interconnecting tips of outermost second teeth arranged on opposite ends of the row of second teeth, a line interconnecting free comb tooth ends of outermost comb teeth arranged on opposite ends of the row of comb teeth.

The first direction may be a movement direction of the moveable blade. The moveable blade may reciprocate or oscillate along the first direction.

A hair cutting kit according to another aspect comprises a handle, a trimmer head, and a comb implement. The trimmer head is attached or releasably attachable to the handle. The trimmer head comprises at least one stationary blade comprising at least one row of blade teeth, wherein the at least one row of blade teeth extends along a first direction, the blade teeth have central longitudinal axes perpendicular to the first direction, and adjacent blade teeth are separated from each other along the first direction by gaps. The comb implement comprises at least one row of comb teeth. The comb implement is configured for reversibly releasable attachment to the trimmer head or the handle. The comb implement is configured such that, when the comb implement is attached to the trimmer head or the handle, the at least one row of comb teeth extends in the first direction, adjacent comb teeth are separated by comb tooth gaps, and some, a majority, or all of the comb teeth overlap at least part of at least some of the gaps between adjacent blade teeth. The comb implement may be configured such that, when the comb implement is attached, mid-planes of some, a majority, or all of the comb teeth are aligned with mid-planes of at least some of the gaps between adjacent blade teeth, wherein the mid-planes of the comb teeth and the mid-planes of the gaps are perpendicular to the first direction.

The comb implement may be configured such that, when the comb implement is attached, comb teeth are arranged in non-overlapping relationship with a fraction of the gaps between adjacent blade teeth.

Each of the comb teeth may be substantially mirror-symmetric relative to its mid-plane.

Each of the comb teeth may have a tip, when viewed in a viewing direction that is perpendicular to the first direction and the central longitudinal axes of the blade teeth, and the mid-plane of each comb tooth may pass through its tip.

The tip of a comb tooth may be arranged at a frontmost edge of the device assembled from the handle, the trimmer head, and the comb implement, with the frontmost edge being the frontmost part of a skin abutment surface in an operative movement direction.

The comb implement may be configured such that, when the comb implement is attached to the trimmer head, some, a majority, or all of the comb teeth overlap associated gaps between adjacent blade teeth.

The comb implement may be configured such that, when the comb implement is attached to the trimmer head, some, a majority, or all of the comb teeth may be arranged in an overlapping relationship with associated gaps between adjacent blade teeth when viewed in a viewing direction that is perpendicular to the first direction and the central longitudinal axes of the blade teeth.

The comb implement may be configured such that, when the comb implement is attached to the trimmer head, at least some of the gaps between blade teeth are not being overlapped by any of the comb teeth.

The comb implement may be configured such that, when the comb implement is attached to the trimmer head, at least some of the gaps between blade teeth are not being overlapped by any of the comb teeth when viewed in a viewing direction that is perpendicular to the first direction and the central longitudinal axes of the blade teeth.

The comb implement may be configured such that, when the comb implement is attached to the trimmer head, the comb teeth overlap every $L^{th}$ gap between adjacent blade teeth, where L is a positive integer that is 2, 3, or greater than 3.

The gaps between adjacent blade teeth may have mid-planes that are perpendicular to the first direction.

The mid-planes of the gaps between adjacent blade teeth may be arranged centrally between tips of adjacent blade teeth.

The comb implement may be configured such that, when the comb implement is attached to the trimmer head, the mid-planes of some, a majority, or all of the comb teeth are aligned with the mid-planes of the gaps between adjacent blade teeth.

The comb implement may be configured such that, when the comb implement is attached to the trimmer head, the mid-planes of some, a majority, or all of the comb teeth coincide with mid-planes of the gaps between adjacent blade teeth.

Each comb tooth may have a J-shaped portion.

The comb implement may be configured such that, when the comb implement is attached to the trimmer head, the J-shaped portion curves around the first direction.

The comb implement may be configured such that, when the comb implement is attached to the trimmer head, the J-shaped portion extends out of a plane that is parallel to a plane spanned by the first direction and the central longitudinal axes of the first or second teeth.

The J-shaped portion may have a width measured along the first direction that is smaller than a blade tooth pitch, wherein the blade tooth pitch is a distance between central longitudinal axes of adjacent blade teeth that are perpendicular to the first direction.

The width of the J-shaped portion may be a distance between two tangential planes that are tangential to opposite flank surfaces of the J-shaped portion, wherein the two tangential planes are spaced along the first direction by the comb tooth width.

The trimmer head may comprise a movable blade arranged for reciprocating movement relative to the stationary blade.

The blade teeth of the stationary blade may have a cutting edge.

Teeth of the movable blade may have another cutting edge.

The trimmer head may be operative for scissor cutting of hairs arranged between the cutting edge of the blade teeth of the stationary blade and the other cutting edge of the teeth of the movable blade.

The mechanical interface of the comb implement may comprise an engagement structure operative for reversibly releasable engagement with an engagement structure of the trimmer head.

The trimmer head may have a mating engagement structure operative for reversibly releasable engagement with the mechanical interface of the comb implement.

The trimmer head may have a handle interface operative for reversibly releasable engagement with the handle.

The handle may comprise an electric motor having a motor shaft and a drive element coupled to or integral with the motor shaft, the drive element being operative to drive a driven element to drive a movable blade.

The handle may comprise a rechargeable battery.

The handle may comprise an electric motor having a motor shaft and a drive element coupled to or integral with the motor shaft, the drive element being operative to drive a driven element to drive a movable blade.

The handle may comprise a rechargeable battery.

Central longitudinal axes of the blade teeth may be perpendicular to the first direction. The central longitudinal axes of adjacent blade teeth may be spaced from each other along the first direction by a blade tooth pitch.

The comb implement may be configured such that when the comb implement is attached to the trimmer head, the at least one row of comb teeth extends in the first direction, adjacent comb teeth of the at least one row of comb teeth are separated from each other along the first direction by comb tooth gaps, mid-planes of the comb teeth are perpendicular to the first direction, and the mid-planes of adjacent comb teeth are spaced from each other along the first direction by a comb tooth pitch.

The comb tooth pitch is equal to the blade tooth pitch multiplied by an integer that is 2, 3, or greater than 3.

According to an aspect, a hair cutting kit comprises a handle, a first trimmer head, and a second trimmer head. The first trimmer head is configured for reversibly releasable attachment to the handle. The first trimmer head comprises at least one first stationary blade comprising at least one row of first teeth. The at least one row of first teeth extends in a first direction. Adjacent first teeth of the at least one row of first teeth are separated from each other along the first direction by first gaps. Central longitudinal axes of the first teeth are perpendicular to the first direction. The central longitudinal axes of adjacent first teeth are spaced from each other along the first direction by a first pitch. The second trimmer head is configured for reversibly releasable attachment to the handle. The second trimmer head comprises at least one second stationary blade comprising at least one row of second teeth. The at least one row of second teeth extends in the first direction. Adjacent second teeth of the at least one row of second teeth are separated from each other along the first direction by second gaps. Central longitudinal axes of the second teeth are perpendicular to the first direction. The central longitudinal axes of adjacent second teeth are spaced from each other along the first direction by a second pitch.

A ratio of the first pitch and the second pitch is a rational number.

The ratio of the first pitch and the second pitch may be 0.3 or more and/or 3.0 or less.

The ratio of the first pitch and the second pitch may be 0.5 or more and/or 2.0 or less.

The hair cutting kit may further comprise a comb implement configured and operative as described herein.

According to an aspect, a method of using a comb implement of a hair cutting kit is provided. The hair cutting kit comprises a handle, a first trimmer head, a second trimmer head, and the comb implement. The method comprises selectively releasably engaging the comb implement with a first trimmer head or with a second trimmer head. The first trimmer head is configured for reversibly releasable attachment to the handle. The first trimmer head comprises at least one first stationary blade comprising at least one row of first teeth. The at least one row of first teeth extends in a first direction. Adjacent first teeth of the at least one row of first teeth are separated from each other along the first direction by first gaps. Central longitudinal axes of the first teeth are perpendicular to the first direction. The central longitudinal axes of adjacent first teeth are spaced from each other along the first direction by a first pitch. The second trimmer head is configured for reversibly releasable attachment to the handle. The second trimmer head comprises at least one second stationary blade comprising at least one row of second teeth. The at least one row of second teeth extends in the first direction. Adjacent second teeth of the at least one row of second teeth are separated from each other along the first direction by second gaps. Central longitudinal axes of the second teeth are perpendicular to the first direction. The central longitudinal axes of adjacent second teeth are spaced from each other along the first direction by a second pitch. The comb implement comprises at least one row of comb teeth. The comb implement may comprise a mechanical interface operative for reversibly releasable attachment of the comb implement to the first trimmer head and for reversibly releasable attachment of the comb implement to the second trimmer head. The comb implement is configured such that when the comb implement is attached to the first trimmer head or the second trimmer head, the at least one row of comb teeth extends in the first direction, adjacent comb teeth of the at least one row of comb teeth are separated from each other along the first direction by comb tooth gaps, mid-planes of the comb teeth are perpendicular to the first direction, and the mid-planes of adjacent comb teeth are spaced from each other along the first direction by a third pitch. The third pitch is equal to the first pitch multiplied by a first integer. The third pitch is equal to the second pitch multiplied by a second integer different from the first integer.

The hair cutting kit may be the hair cutting kit according to any one of the aspects disclosed herein.

The hair cutting kit, when assembled, may be operative as a hair trimmer, hair clipper, and/or body groomer. At least one trimmer head of the hair cutting kit may be operative for trimming hairs in an armpit area, bikini zone, and/or intimate area. At least one other trimmer head of the hair cutting kit may be operative for trimming scalp or beard hair. The comb implement may be operative for being used both when the hair cutting kit is configured (e.g., by assembly of a second trimmer head to the handle) for trimming hairs in an armpit area, bikini zone, and/or intimate area, and when the hair cutting kit is configured (e.g., by assembly of a first trimmer head to the handle) trimming scalp or beard hair.

FIG. 1 is a view of a hair cutting kit 10. The hair cutting kit 10 comprises a handle 20, a first trimmer head 30, a second trimmer head 40, and a comb implement 50. While only one comb implement 50 is shown in FIG. 1, the hair cutting kit may comprise two, three or more than three different comb implements, at least some of which are configured to function efficiently on different trimmer heads 30, 40 having different tooth pitches.

The first trimmer head 30 is configured for reversibly releasable attachment to the handle 20. The first trimmer head 30 is configured to be repeatedly engaged with and disengaged from the handle 20 in a destruction-free manner. As will be described in more detail below, the first trimmer head 30 comprises at least one first stationary blade comprising at least one row of first teeth, with the first teeth having a first pitch.

The second trimmer head 40 is configured for reversibly releasable attachment to the handle 20. The second trimmer head 40 is configured to be repeatedly engaged with and disengaged from the handle 20 in a destruction-free manner. As will be described in more detail below, the second trimmer head 40 comprises at least one second stationary blade comprising at least one row of second teeth, with the second teeth having a second pitch different from the first pitch.

The comb implement 50 has a mechanical interface that allows the comb implement 50 to be selectively engaged with either one of the first trimmer head 30 and the second trimmer head in a destruction-free manner. The comb implement 50 has comb teeth having a third pitch. The comb implement 50 is configured to effectively guide hairs into gaps between first teeth of the first stationary blade when used in association with the first trimmer head 30. The comb implement 50 is configured to effectively guide hairs into gaps between second teeth of the second stationary blade when used in association with the second trimmer head 40. The third pitch of the comb implement may be matched to both first pitch and the second pitch, being an integer multiple of the first pitch and another integer multiple of the second pitch.

The handle 20 may comprise a control element 22 operatively coupled to a motor control of the handle 20. In response to activation of the control element 22, a motor integrated in a housing of the handle 20 may be powered on or off. An output shaft of the motor may drive, via a rotary-to-linear motion conversion mechanism, a moveable blade in the trimmer head respectively attached to the handle, causing the moveable blade to oscillate in a reciprocating manner.

The handle 20 may comprise an adjustment mechanism 21 for adjustment of the trimmer head attached to the handle 20 and/or for adjustment of the comb implement 50. The adjustment mechanism 21 may allow the comb implement 50 to be repositioned relative to the trimmer head attached to the handle 20. The adjustment mechanism 21 may comprise a rotary or linear adjustment mechanism.

The handle 20 has a first handle end 29 that, in use, is remote from the user's skin, and an opposite second handle end with a mechanical interface 28 for reversibly releasable attachment of the first trimmer head 30 or the second trimmer head 40, 40', as needed. A handle longitudinal direction 27 extends from the first handle end 29 to the opposite second handle end to which one of the trimmer heads is attached in use. As will be described in more detail below, the trimmer heads 30, 40, 40' respectively have a stationary blade and a moveable blade. The stationary blade comprises a row of teeth, with the row of teeth extending in a direction (referred to as first direction herein) that is oriented transverse to the handle longitudinal direction 27.

The different first trimmer head 30 and second trimmer head 40, 40' can be assembled to the handle by a user depending on the cutting operation desired by the user. For thick hair and normal skin, a first trimmer head 30 with a larger pitch can be assembled to the handle 20. Due to the larger pitch, many hairs can be captured and cut at once. For areas of the body where the skin is very sensitive and flexible and the hair density is lower, for example the intimate area, the second trimmer head 40, 40' with a smaller pitch can be assembled to the handle 20. The smaller pitch protects the skin as it cannot easily get into the small gaps of the cutting system of the second trimmer head 40, 40'. The smaller pitch means that not as much hair can be cut.

The comb implement 50 does not always need to be assembled to the trimmer head. The first trimmer head 30 and/or second trimmer head 40, 40' can be used directly on the skin, in which case the hair is cut to a length approximately equal to a thickness of the stationary blade of the trimmer head. To achieve longer hair lengths, the comb implement 50 can be assembled.

These comb implement 50 has comb teeth. The comb teeth are operative to increase a distance between the skin and the blades of the trimmer head. The comb teeth are operative to guide the hair to the blades of the trimmer head. The comb implement 50 is configured to efficiently feed the hair to the blades of the trimmer head, irrespective of whether the same comb implement 50 is assembled to the first trimmer head 30 or the second trimmer head 40, 40'.

Figure 2:
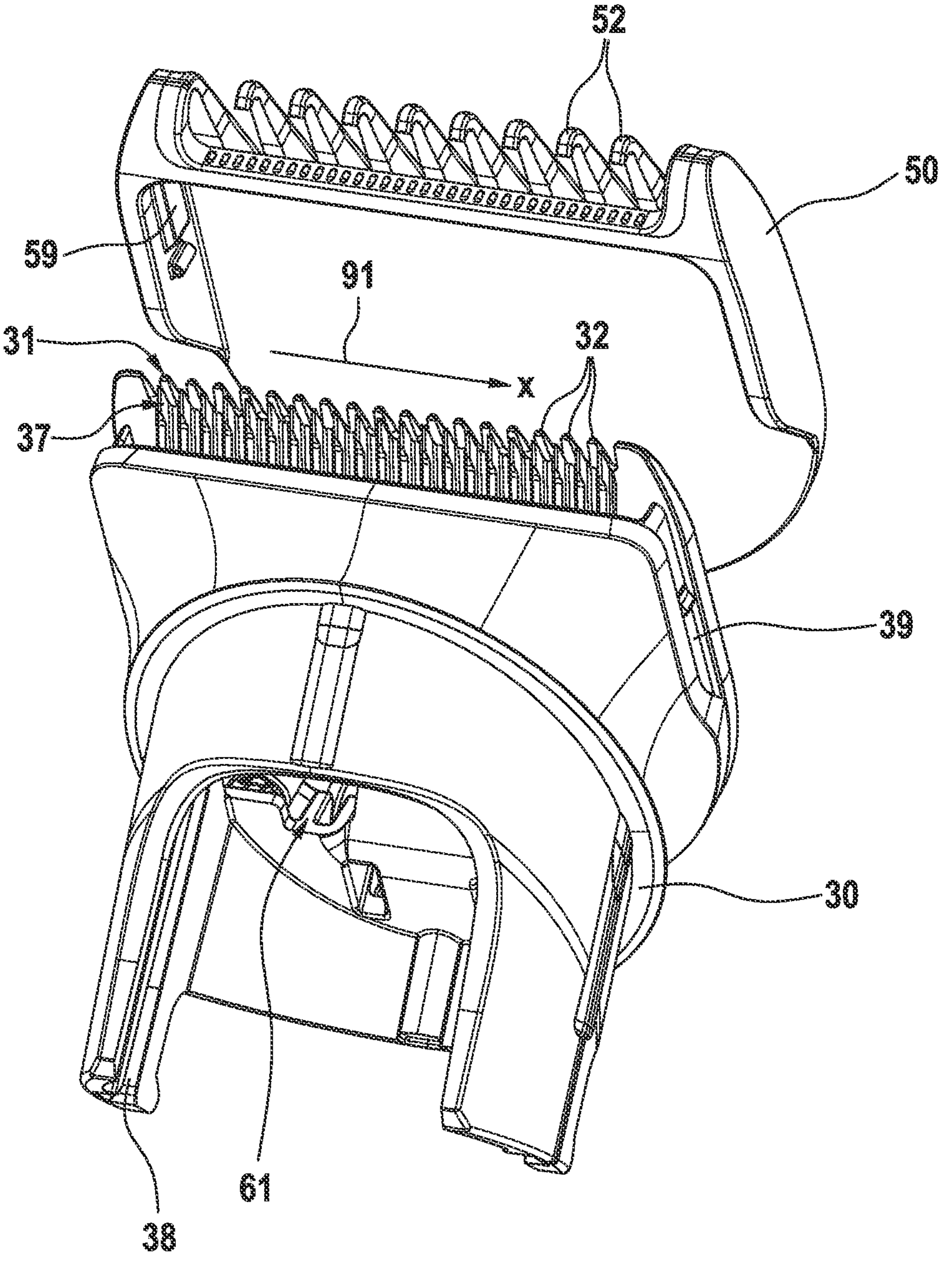
FIG. 2 is a view of a first trimmer head and a comb implement of the hair cutting kit in a disassembled state.
Figure 3:
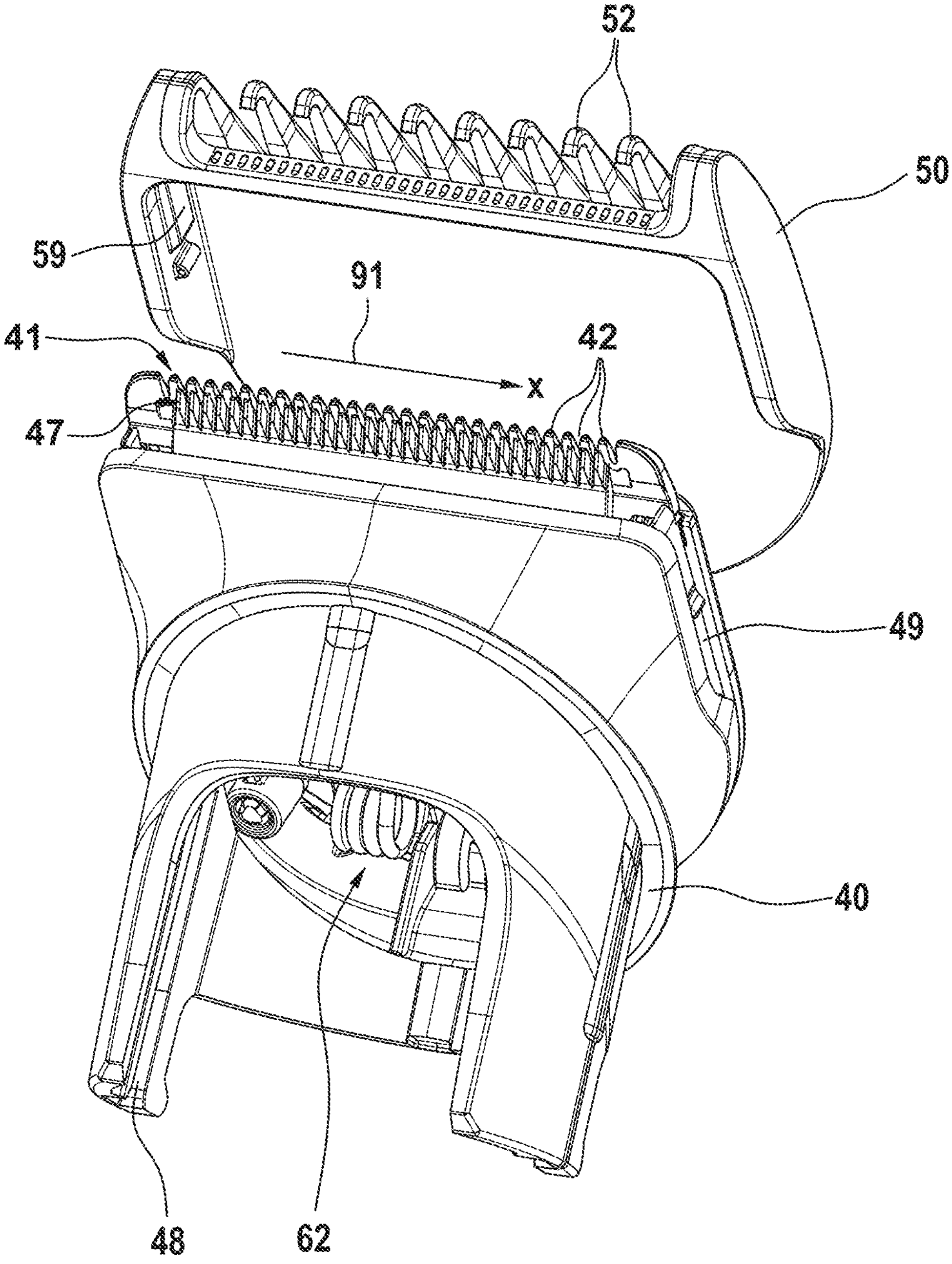
FIG. 3 is a view of a second trimmer head and the comb implement of the hair cutting kit in a disassembled state.
Figure 4:
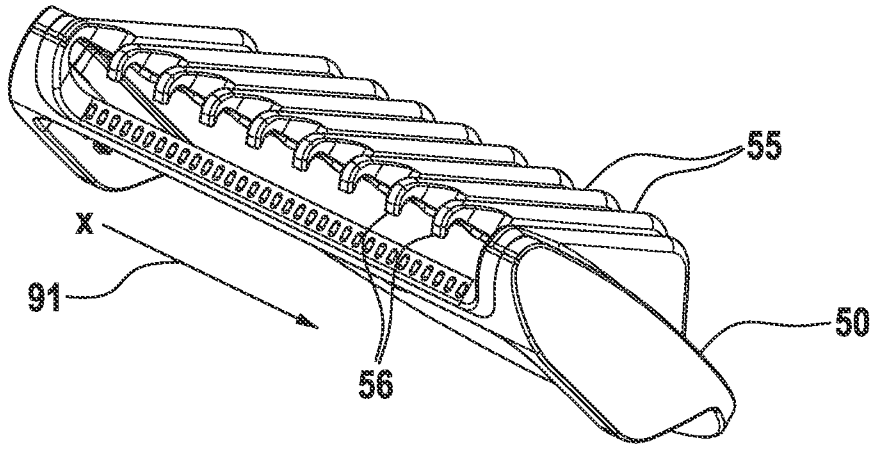
FIG. 4 is a perspective view of the comb implement.

FIG. 2 is a view of the first trimmer head 30 and the comb implement 50 of a hair cutting kit 10 in a disassembled state. FIG. 3 is a view of the second trimmer head 40 and the comb implement 50 of a hair cutting kit in a disassembled state. FIG. 4 is a perspective view of the comb implement 50.

The first trimmer head 30 has a first handle interface 38 operative for reversibly releasable engagement with the engagement structure 28 of the handle 20. The first trimmer head 30 comprises a stationary blade 31 and a movable blade 37. The moveable blade 37 is operative to oscillate relative to the stationary blade 31 when a driven element 61 of the first trimmer head 30 is driven by an output element of the handle 20.

The stationary blade 31 comprises a row of first teeth 32. The row of first teeth 32 extends in a first direction 91. The first direction 91 is also referred to as x-direction herein. When the first trimmer head 30 is assembled to the handle 20, the first direction 91 may be generally transverse to the handle longitudinal axis 27.

The first trimmer head 30 comprises a mating engagement structure 39 operative for reversibly releasable engagement with a mechanical interface 59 of the comb implement 50. The engagement structure 39 and the mechanical interface 59 may be operative to secure the comb implement 50 on the first trimmer head 30. This may be achieved by a form-fit and/or a force-fit (e.g., a friction-fit) between the mechanical interface 59 of the comb implement 50 and the engagement structure 39 of the first trimmer head 30.

The second trimmer head 40, 40' has a second handle interface 48 operative for reversibly releasable engagement with the engagement structure 28 of the handle 20. The second trimmer head 40 comprises a stationary blade 41, 41' and a movable blade 47, 47'. Different configurations of these blades will be described in more detail below. The second trimmer head is designated with reference numeral 40 when implemented with stationary blade 41. The second trimmer head is designated with reference numeral 40' when implemented with stationary blade 41'. The moveable blade 47, 47' is operative to oscillate relative to the stationary blade 41 when a driven element 62 of the second trimmer head 40 is driven by the output element of the handle 20.

The stationary blade 41 comprises a row of second teeth 42. The row of second teeth 42 extends in the first direction 91. The first trimmer head 30 and the second trimmer head 40, 40' are configured such that the first direction 91 along which the row of teeth of the stationary blade extends may be the same (which encompasses the case of the parallel lines that extend in the same first direction but with an offset).

The second trimmer head 40 comprises a mating engagement structure 49 operative for reversibly releasable engagement with a mechanical interface 59 of the comb implement 50. The engagement structure 49 and the mechanical interface 59 may be operative to secure the comb implement 50 on the second trimmer head 40. This may be achieved by a form-fit and/or a force-fit (e.g., a friction-fit) between the mechanical interface 59 of the comb implement 50 and the engagement structure 49 of the second trimmer head 40.

The comb implement 50 comprises a mechanical interface 59 operative for reversibly releasable attachment of the comb implement 50 to the first trimmer head 30 and for reversibly releasable attachment of the comb implement 50 to the second trimmer head 40, 40'. When the comb implement 50 is attached to the first or second trimmer head, a row of comb teeth 52 extends along the first direction 91. Positions of the comb teeth 52 along the first direction 91 may be dependent on positions of the first teeth 32 of the stationary blade 31 of the first trimmer head 30 along the first direction 91 and on positions of the second teeth 42, 42' of the stationary blade 41, 41' of the second trimmer head 40, 40' along the first direction 91, as will be explained below. For illustration, a spacing of the comb teeth 52 along the first direction 91 may be dependent on a spacing of the first teeth 32 of the stationary blade 31 of the first trimmer head 30 along the first direction 91 and on a spacing of the second teeth 42, 42' of the stationary blade 41, 41' of the second trimmer head 40, 40' along the first direction 91, as will be explained below.

The comb implement 50 may define a skin surface operative to abut on the skin in use of the device. The comb implement 50 may comprise a plurality of ridges 55 that are each directed perpendicular to the first direction 91 when the comb implement 50 is assembled to the first trimmer head 30 or the second trimmer head 40, 40'. The ridges 55 are offset from each other along the first direction 91. A tangential plane to the plurality of ridges 55 may define a skin abutment surface. As best seen in FIG. 4, the comb teeth 52 may have J-shaped portions 56 that extend to free ends of the comb teeth 52. The J-shaped portions 56 may curve out of the skin abutment surface, towards and at least partially around the stationary blade of the trimmer head to which the comb implement is attached.

Features of the stationary blade 31 of the first trimmer head 30, of the stationary blade 41, 41' of the second trimmer head 40, 40', and of the row of comb teeth 52 will be explained in more detail with reference to FIGS. 5 to 8.

Figure 5:
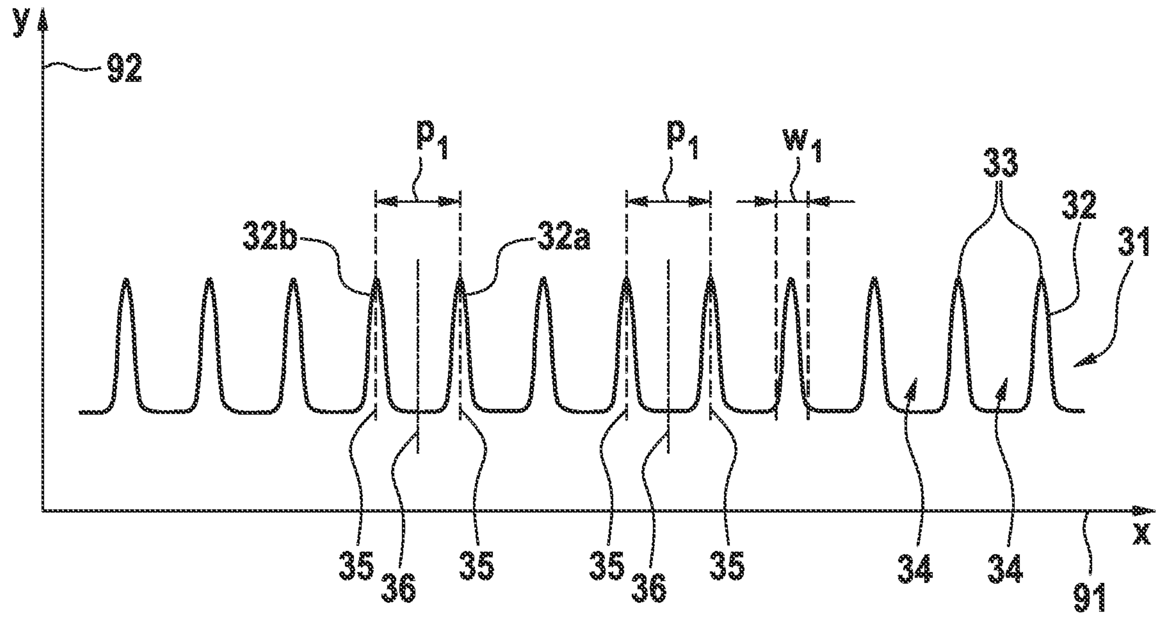
FIG. 5 is a partial plan view of a stationary blade of the first trimmer head.
Figure 6:
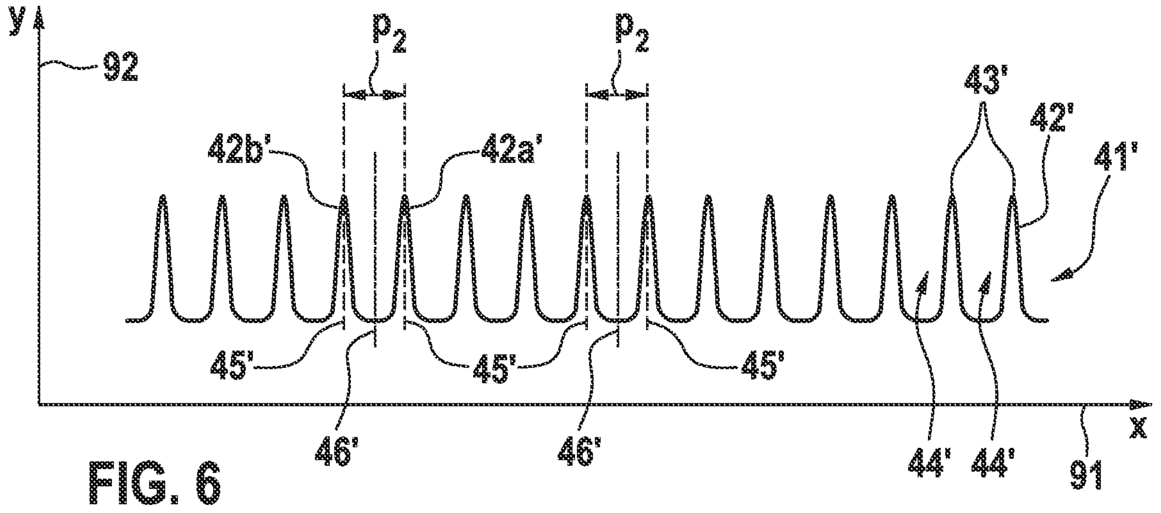
FIG. 6 is a partial plan view of a stationary blade of the second trimmer head.
Figure 7:
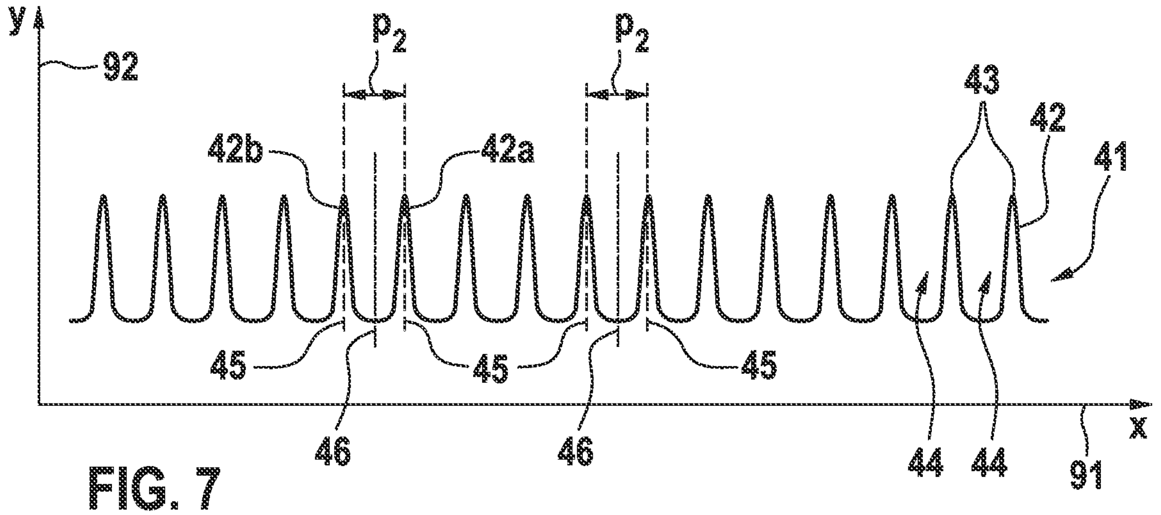
FIG. 7 is a partial plan view of a stationary blade of the second trimmer head of another aspect.
Figure 8:
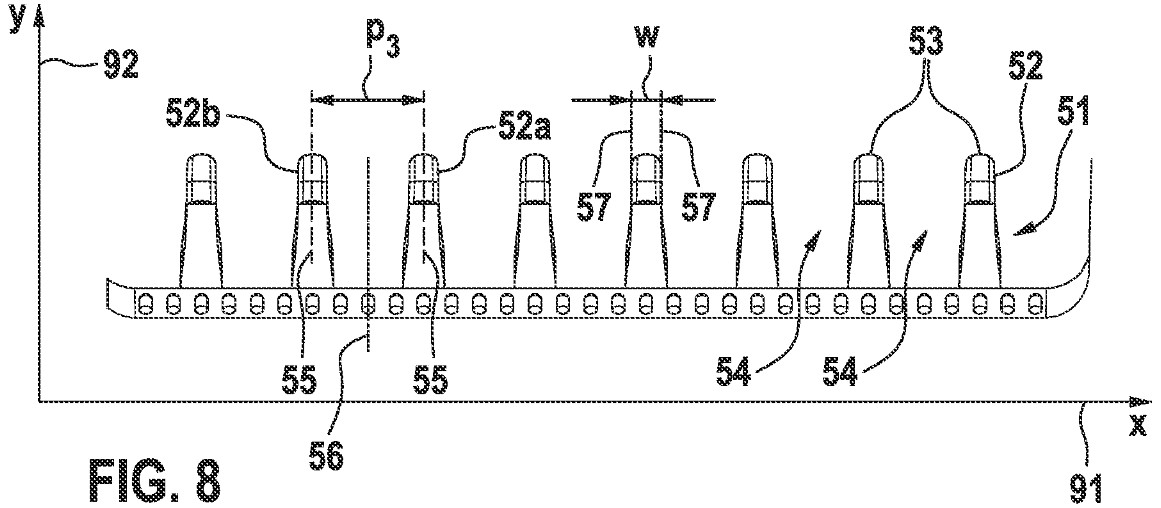
FIG. 8 is a partial plan view of the comb implement.

FIG. 5 is a partial plan view of the stationary blade 31 of the first trimmer head 30. FIG. 6 is a partial plan view of the stationary blade 41 of the second trimmer head 40. FIG. 7 is a partial plan view of the stationary blade 41' of the second trimmer head 40' according to another aspect. FIG. 8 is a partial plan view of the comb implement 50.

As shown in FIG. 5, the stationary blade 31 of the first trimmer head 30 comprises a row of first teeth 32. The number of first teeth 32 may be different from the number illustrated in FIG. 5. For illustration, the first trimmer head 30 may have ten or more, twelve or more, fifteen or more, or seventeen or more first teeth 32.

Each of the first teeth 32 has a central longitudinal axis 35. The central longitudinal axis 35 may be defined as axis extending on a surface of the stationary blade 31 on which the moveable blade 37 abuts, with the central longitudinal axis 35 being perpendicular to the first direction 91 and passing through the tip 33 of one of the first teeth. The central longitudinal axes 35 of different first teeth 32 may be parallel to each other. The central longitudinal axes 35 of different first teeth 32 may extend in a co-planar arrangement.

The tips 33 of the first teeth 32 may be the outermost points (which, in use, are arranged to point in a movement direction of the hair cutting device assembled from the hair cutting kit) as seen in a plan view, with a viewing direction of the plan view being directed perpendicular to the first direction 91 and a second direction 92 (also referred to as y-direction herein) along which the central longitudinal axes 35 of the first teeth 32 extend.

The first teeth 32 may be arranged in an equidistant manner A first pitch $p_1$ may be determined as a distance between central longitudinal axes 35 between adjacent first teeth 32*a*, 32*b*.

Adjacent first teeth 32 are respectively separated by a gap 34. Mid-planes 36 of gaps 34 may respectively be defined as planes orthogonal to the first direction 91 and spaced by equal distanced from the central longitudinal axes 35 of the adjacent teeth 32*a*, 32*b* arranged on opposite sides of the gap 34.

Each first tooth 32 of the first stationary blade 31 may have a cutting edge. Teeth of the first movable blade 37 may have another cutting edge. The first trimmer head 30 may be operative for scissor cutting of hairs arranged between the cutting edge of the first teeth 32 of the first stationary blade 31 and the other cutting edge of the teeth of the first movable blade 37.

Each first tooth 32 of the first stationary blade 31 may have a tooth width $w_1$, measured along the first direction. Each comb tooth may have a comb tooth width w (which will be explained in more detail with reference to FIG. 8). The comb tooth width w may be greater than or smaller than the tooth width $w_1$ of the first teeth.

As shown in FIGS. 6 and 7, the stationary blade 41, 41' of the second trimmer head 40, 40' comprises a row of second teeth 42, 42'. The number of second teeth 42, 42' may be different from the number illustrated in FIGS. 6 and 7. For illustration, the second trimmer head 40, 40' may have fifteen or more, seventeen or more, twenty or more, or twenty-five or more second teeth 42, 42'.

Each of the second teeth 42, 42' has a central longitudinal axis 45, 45'. The central longitudinal axis 45, 45' may be defined as axis extending on a surface of the stationary blade 41, 41' on which the moveable blade 47, 47' abuts, with the central longitudinal axis 45, 45' being perpendicular to the first direction 91 and passing through the tip 43, 43' of one of the second teeth. The central longitudinal axes 45, 45' of different second teeth 42, 42' may be parallel to each other. The central longitudinal axes 45, 45' of different second teeth 42, 42' may extend in a co-planar arrangement.

The tips 43, 43' of the second teeth 42, 42' may be the outermost points (which, in use, are arranged to point in a movement direction of the hair cutting device assembled from the hair cutting kit) as seen in a plan view, with a viewing direction of the plan view being directed perpendicular to the first direction 91 and the second direction 92 along which the central longitudinal axes 45, 45' of the second teeth 42, 42' extend.

The second teeth 42, 42' may be arranged in an equidistant manner A second pitch $p_2$ may be determined as a distance between central longitudinal axes 45, 45' between adjacent second teeth 42*a*, 42*b* or 42*a*', 42*b*'.

Adjacent second teeth 42, 42' are respectively separated by a gap 44, 44'. Mid-planes 46, 46' of gaps 44, 44' may respectively be defined as planes orthogonal to the first direction 91 and spaced by equal distanced from the central longitudinal axes 45, 45' of the adjacent second teeth 42*a*, 42*b* or 42*a*', 42*b*' arranged on opposite sides of the gap 44, 44'.

As will be explained in more detail with reference to FIGS. 11 to 14, the second trimmer head 40 and the second trimmer head 40' may be distinguished with regard to the way in which the comb implement 50 interacts therewith when assembled.

Each second tooth 42, 42' of the second stationary blade 41, 41' may have a cutting edge. Teeth of the second movable blade 47, 47' may have another cutting edge. The second trimmer head 40 may be operative for scissor cutting of hairs arranged between the cutting edges of the second teeth 42, 42' of the second stationary blade 41, 41' and the other cutting edges of the teeth of the second movable blade 47, 47'.

FIG. 8 is a plan view of the comb implement 50, seen in a viewing direction perpendicular to the first direction 91 and perpendicular to the second direction 91. The comb implement 50 comprises a row of comb teeth 52. The number of comb teeth 52 may be different from the number illustrated in FIG. 8. For illustration, the comb implement 50 may have five or more, eight or more, or ten or more comb teeth 52.

Each of the comb teeth 52 has a mid-plane 55. The mid-plane 55 may be defined as plane extending perpendicular to the first direction 91 and passing through the tip 53 of one of the comb teeth. The mid-planes 55 of different comb teeth 52 are parallel to each other.

The tips 53 of the comb teeth 52 may be the outermost points (which, in use, are arranged to point in a movement direction of the hair cutting device assembled from the hair cutting kit) as seen in a plan view, with the viewing direction of the plan view being directed perpendicular to the first direction 91 and the second direction 92.

The comb teeth 52 may be arranged in an equidistant manner A third pitch $p_3$ may be determined as a distance between mid-planes 55 of adjacent comb teeth 52*a*, 52*b*.

Adjacent comb teeth 52 are respectively separated by a gap 54. Mid-planes 56 of gaps 54 may respectively be defined as planes orthogonal to the first direction 91 and spaced by equal distanced from the mid-planes 55 of the adjacent teeth 52*a*, 52*b* arranged on opposite sides of the gap 54.

The comb teeth 52 may have a comb tooth width w. The comb tooth width w may be a distance between two tangential planes 57 that are tangential to opposite flank surfaces of the J-shaped portion 56 of the comb tooth 52, wherein the two tangential planes 57 are spaced along the first direction 91 by the comb tooth width w.

As will be described in more detail with reference to FIGS. 9 to 14, the comb implement 50, first trimmer head 30, and second trimmer head 40, 40' are configured in such a manner that the third pitch $p_3$ of the comb implement 50 is matched to (e.g., in the sense of being an integer multiple of) the first pitch $p_1$ of the first trimmer head 30 and the second pitch $p_2$ of the second trimmer head 40, 40'. Thereby, good alignment between comb implement and the cutting units of both trimmer heads can be attained.

In the interest of cutting efficiency, the comb implement 50, the first trimmer head 30, and the second trimmer head 40, 40' are configured in such a manner that third pitch $p_3$ is equal to the first pitch $p_1$ multiplied by a first integer (which will also be referred to as M). The third pitch $p_3$ is equal to the second pitch $p_1$ multiplied by a second integer (which will also be referred to as N) different from the first integer.

In order to lend themselves for operation with the same comb implement 50, the first trimmer head 30, and the second trimmer head 40, 40' are configured in such a manner that a ratio of the first pitch and the second pitch, $p_1/p_2$, is a rational number.

A ratio of the first integer divided by the second integer, M/N, may be 0.3 or more and/or 3.0 or less. A ratio of the first integer divided by the second integer, M/N, may be 0.5 or more and/or 2.0 or less. Such configurations allow the comb implement 50 to efficiently guide hair to the blades of a cutting unit, irrespective of whether the comb implement 50 is assembled with the first trimmer head 30 or the second trimmer head 40, 40'.

The first integer and the second integer may differ from each other by 1 or 2. I.e., a modulus of a difference between the first and second integers, $|M-N|$, may be 1 or 2.

The first integer and the second integer may be greater than 1. The first integer and the second integer may be 5 or smaller. These multiplicative factors provide benefits with regard to efficiency.

For illustration rather than limitation, the first integer may be equal to 2 and the second integer may be equal to 3. In this case, the comb teeth 52 may be aligned with every second tooth 32 of the first stationary blade 31 when the comb implement 50 is assembled with the first trimmer head 30. The comb teeth 52 may be aligned with every third tooth 42 of the second stationary blade 41 when the comb implement 50 is assembled with the second trimmer head 40. The comb teeth 52 may be aligned with every third inter-tooth gap 44' of the stationary blade 41' when the comb implement 50 is assembled with the second trimmer head 40'.

Figure 9:
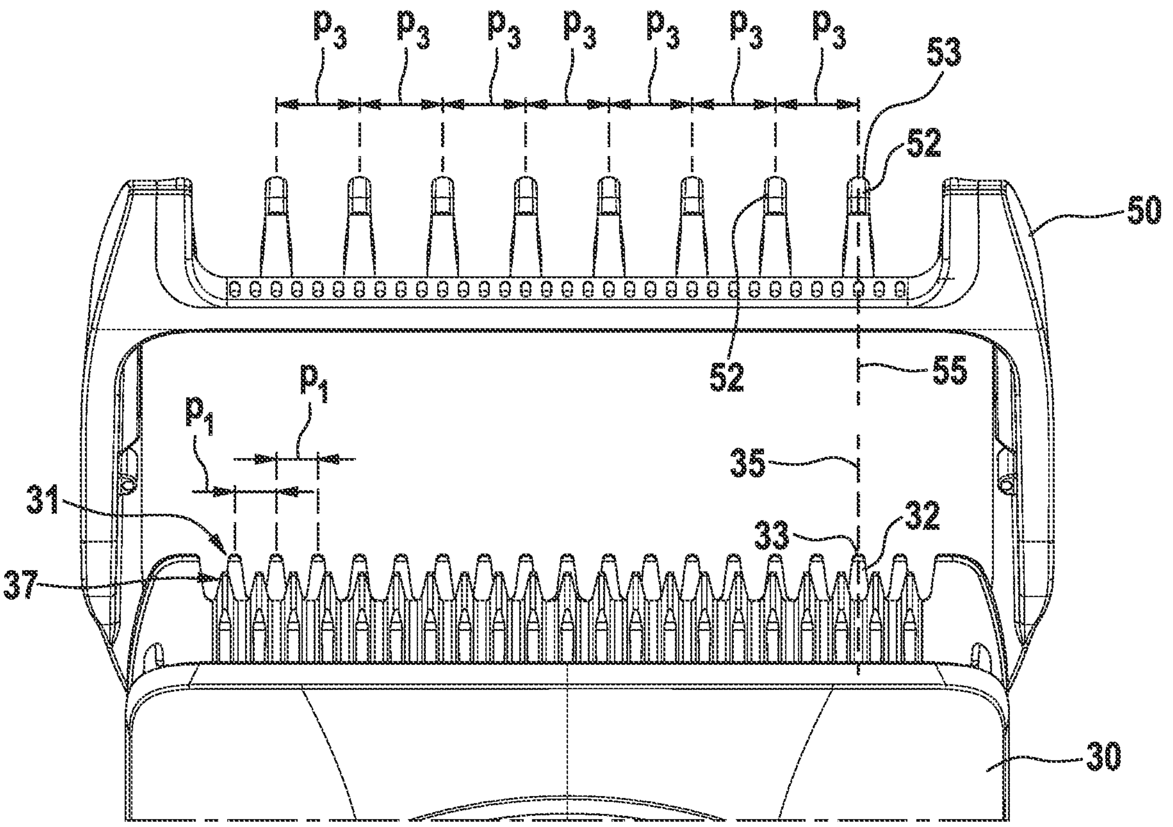
FIG. 9 is a plan view of the first trimmer head and comb implement in a disassembled state.
Figure 10:
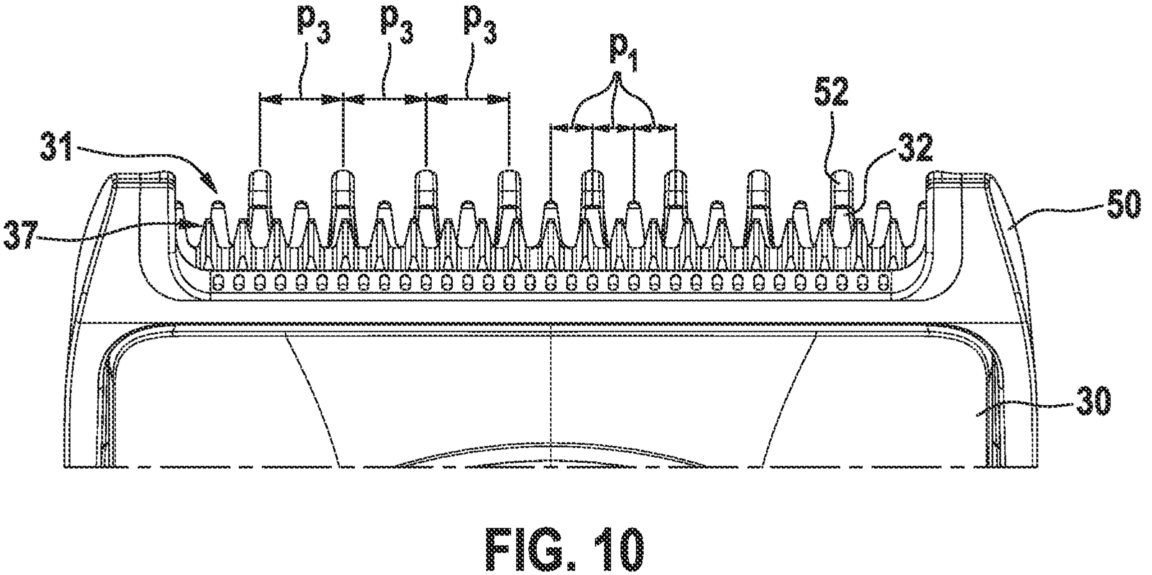
FIG. 10 is a plan view of the first trimmer head and comb implement in an assembled state.
Figure 11:
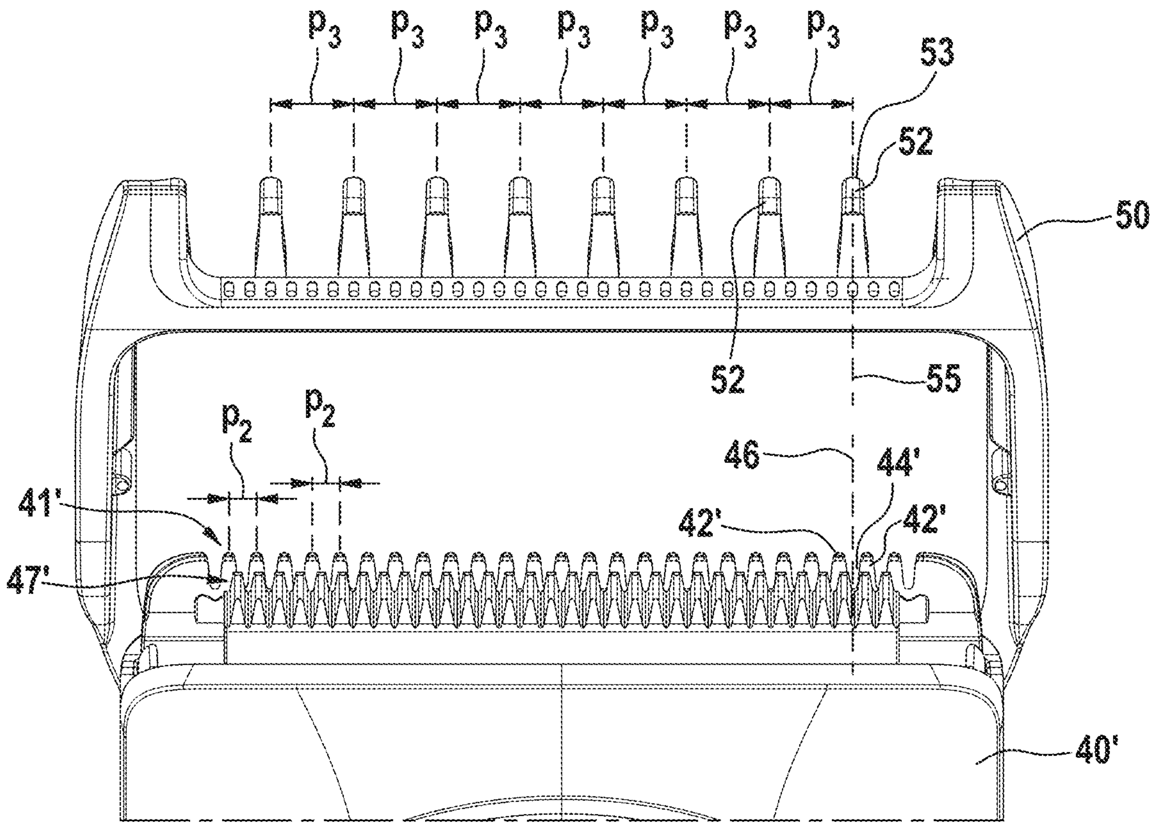
FIG. 11 is a plan view of the second trimmer head and comb implement in a disassembled state.
Figure 12:
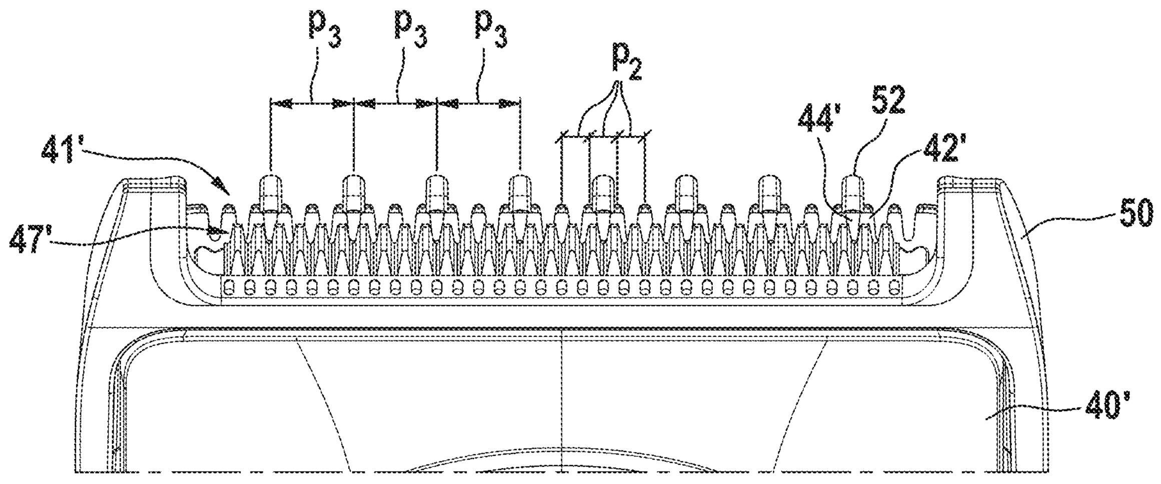
FIG. 12 is a plan view of the second trimmer head and comb implement in an assembled state.
Figure 13:
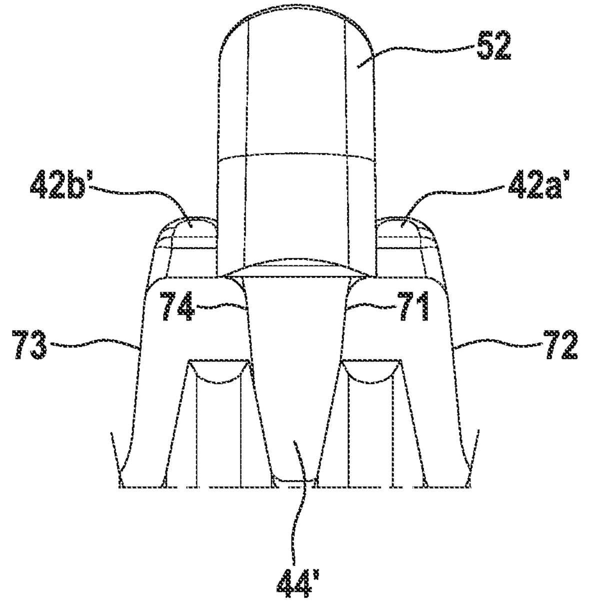
FIG. 13 is an enlarged partial plan view of the second teeth of the second trimmer head and a comb tooth of the comb implement in the assembled state of FIG. 12.
Figure 14:
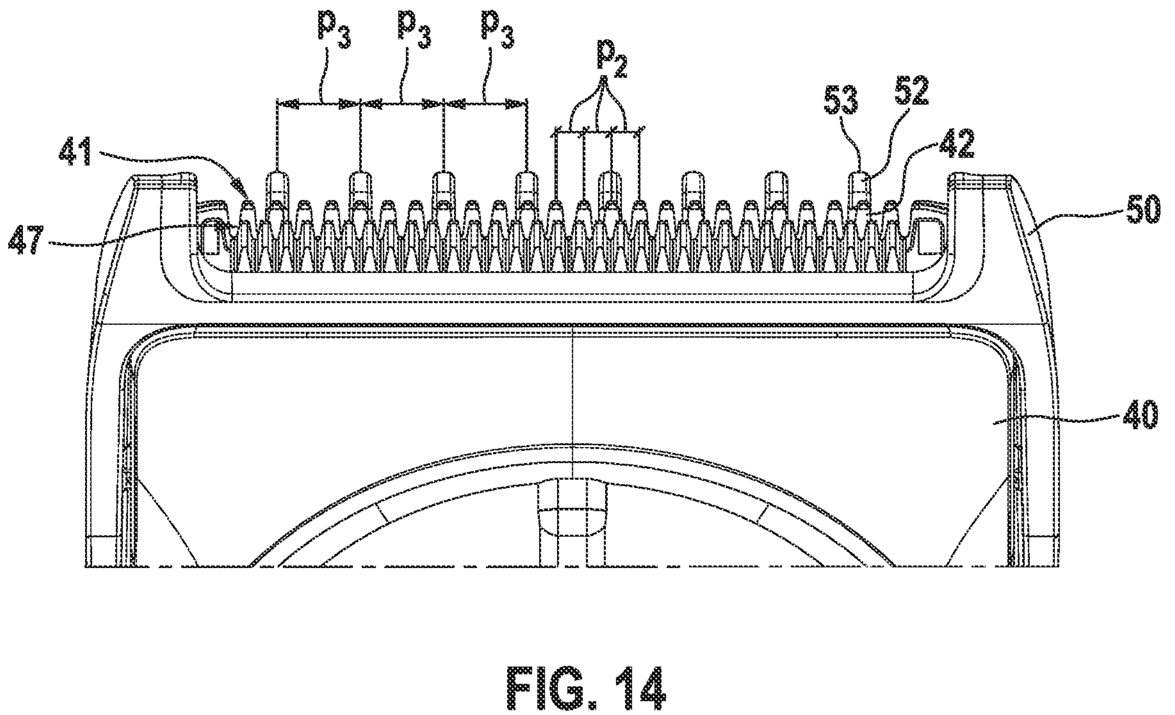
FIG. 14 is a plan view of the second trimmer head and comb implement in an assembled state.

The interplay of the comb implement 50 and the trimmer heads will be described in more detail with reference to FIGS. 9 to 14. FIG. 9 is a plan view of the first trimmer head 30 and comb implement 50 in a disassembled state, showing the comb implement 50 offset perpendicular to the first direction 91 from the first trimmer head 30. FIG. 10 is a plan view of the first trimmer head 30 and comb implement 50 in an assembled state. FIG. 11 is a plan view of the second trimmer head 40' and comb implement 50 in a disassembled state, showing the comb implement 50 offset perpendicular to the first direction 91 from the second trimmer head 40'. FIG. 12 is a plan view of the second trimmer head 40' and comb implement 50 in an assembled state. FIG. 13 is an enlarged partial plan view of the second teeth 42' of the second trimmer head 40' and a comb tooth 52 of the comb implement 50 in the assembled state of FIG. 12. FIG. 14 is a plan view of the second trimmer head 40 and comb implement 50 in an assembled state.

FIGS. 9 and 10 show the first trimmer head 30 and comb implement 50. The third pitch $p_3$ is equal to the first pitch $p_1$ multiplied by a first integer. The first integer may be 2 or greater than 2. The first integer may be 5 or less than 5.

The comb implement 50 may be configured such that, when the first trimmer head 30 is attached to the handle 20 and the comb implement 50 is attached to the first trimmer head 30, some, a majority, or all of the comb teeth 52 overlap associated first teeth 32. At least sone of the first teeth 32 may not be overlapped by any one of the comb teeth 52.

Mid-planes 55 of some, a majority, or all of the comb teeth 52 may be aligned with the central longitudinal axes 35 of associated first teeth 32. Central longitudinal axes of other first teeth 32 that are not being overlapped by any one of the comb teeth 52 may be spaced from the mid-planes of all of the comb teeth 52. As shown in FIG. 9 and FIG. 10, the mid-planes 55 of all comb teeth 52 may be aligned with the central longitudinal axes 35 of associated first teeth 32, but other configurations may be used.

When the comb implement 50 is attached to the first trimmer head 30, some, a majority, or all of the first gaps 34 between first teeth 32 are not or only partially overlapped by any of the comb teeth 52.

Such a configuration allows the comb implement 50 to efficiently guide hair towards the stationary and moveable blades 31, 37 for scissor cutting.

FIGS. 11 and 12 show the second trimmer head 40' and comb implement 50. The third pitch $p_3$ is equal to the second pitch $p_2$ multiplied by a second integer. The second integer may be 2 or greater than 2. The second integer may be 5 or less than 5.

The comb implement 50 may be configured such that, when the comb implement is attached to the second trimmer head 40', some, a majority, or all of the comb teeth 52 overlap associated second gaps 44' between adjacent second teeth 42'. Some, a majority, or all of the comb teeth 52 may be arranged in an overlapping relationship with associated second gaps 44' when viewed in a viewing direction that is perpendicular to the first direction 91 and the central longitudinal axes 35' of the second teeth 42' (i.e., the viewing direction of FIGS. 11 and 12).

The comb implement 50 may be configured such that, when the comb implement 50 is attached to the second trimmer head 40', at least some of the second gaps 44' are not being overlapped by any of the comb teeth 52, as shown in FIG. 12.

The comb implement 50 may be configured such that comb teeth 52 overlap every $L^{th}$ second gap, where L is a positive integer that is 2, 3, or greater than 3. L may be 5 or less.

In the configuration of FIGS. 11 and 12, when the comb implement 50 is attached to the second trimmer head 40', the mid-planes 55 of some, a majority, or all of the comb teeth 52 are aligned with (e.g., coincide with) the mid-planes 55 of the second gaps 44'.

While the configuration of FIGS. 11 and 12 reduces or essentially blocks the feeding of hair into some of the gaps 44', the comb teeth 52 are arranged so as not to block a majority of the gaps 44'. Surprisingly, efficient feeding is attained using the configuration of FIGS. 11 and 12 even though the comb teeth 52 reduce or essentially block the feeding of hair into some of the gaps 44' with which comb teeth 52 overlap.

FIG. 13 is an enlarged plan view of adjacent second teeth 42*a*' and 42*b*' and a comb tooth 52 overlapping a gap 44' between the adjacent second teeth 42*a*' and 42*b*'. The comb tooth 42 may be dimensioned to extend, in a plan view perpendicular to the first direction 91 and the second direction 92 (as shown in FIG. 13), in at least partially overlapping relationship with side faces 71, 74 of the adjacent second teeth 42*a*' and 42*b*' that delimit the gap 44' therebetween. The comb tooth 42 may be dimensioned such that it does not extend, in a plan view perpendicular to the first direction 91 and the second direction 92 (as shown in FIG. 13), to or beyond the side faces 72, 73 of the adjacent second teeth 42*a*' and 42*b*' that are arranged opposite the side faces 71, 74 delimiting the gap 44'. Such a configuration ensures that second gaps adjacent the second gap 44' that is being covered by the comb tooth 52 remain completely or substantially unobstructed for receiving hair.

The configuration explained with reference to FIGS. 11 to 13 is less demanding to implement for the smaller pitch $p_2$ of the second trimmer head 40'. It is not required to align the comb teeth 52 with the second teeth 42', but the mid-plane 55 of the comb-teeth should preferably be located on or along a central region of the gap 44'. The comb teeth 52 can be manufactured to have a width w that is wider than the width of the second teeth 42' of the stationary cutting blade 41', while ensuring that a majority of the second gaps 44' remain unobstructed by comb teeth 52.

FIG. 14 shows the second trimmer head 40 and comb implement 50. The third pitch $p_3$ is equal to the second pitch $p_2$ multiplied by a second integer. The second integer may be 2 or greater than 2. The second integer may be 5 or less than 5.

The comb implement 50 may be configured such that, when the comb implement 50 is attached to the second trimmer head 40, some, a majority, or all of the comb teeth 52 are aligned with associated second teeth 42. The mid-planes 55 of some, a majority, or all of the comb teeth 52 may be aligned with the central longitudinal axes 45 of associated second teeth 42.

In the configuration of FIG. 14, the comb teeth 52 are aligned with a sub-set of the second teeth 42 so that no gaps 44 are completely covered. This assists in efficient feeding of hair towards the cutting unit of the second trimmer head 40.

As explained with reference to FIGS. 5 to 14, efficient cutting is attained when the third pitch $p_3$ of the comb teeth is an integer multiple of the first and/or second pitches $p_2$, $p_3$ of the blade teeth with which the comb implement 50 is to be used. For small integer multiples and comparable narrow comb teeth 52, it may be suitable to position the comb teeth 52 and the teeth 32, 42 of the stationary blade in alignment with each other, e.g., in an overlapping arrangement with the comb teeth 52 overlapping teeth 32, 42 of the stationary blade partially or completely. For larger integer multiples and comparable wide comb teeth 52, it may be suitable to position the comb teeth 52 in alignment with the gaps 44' between adjacent blade teeth 42'. In order to allow different trimmer heads 30, 40, 40' to be used with one, two, or more comb implements 50, a particularly efficient hair cutting kit is attained when the comb implement(s) 50 function efficiently on the different trimmer heads 30, 40, 40'. Thus, the third pitch $p_3$ of the comb implement 50 (or of several comb implements, if provided) is both an integer multiple of the first pitch $p_1$ of one trimmer head 30 and another integer multiple of the second pitch $p_2$ of another trimmer head 40, 40'. Good compatibility of a comb implement with various trimmer heads is attained thereby. The compatibility with different trimmer heads is attained not only with respect to geometry fit but also with respect to hair cutting efficiency and skin sensitivity In the hair cutting kit 10, at least one comb implement (or optionally more comb implements) can be used efficiently on several different trimmer heads. It is not required to supply different comb implements that are each tailored for only one of the different trimmer heads, because the same comb implement(s) can be used for the different trimmer heads, without compromising skin sensitivity and cutting efficiency.

Figure 15:
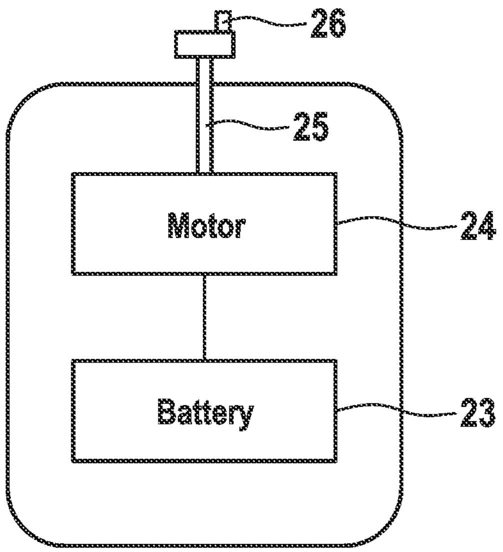
FIG. 15 is a functional block representation of a handle of the hair cutting kit.

The moveable blade in the trimmer heads 30, 40, 40' may be driven in various ways. FIG. 15 is a schematic block diagram of the handle 20. The handle 20 may have an outer shell in which a rechargeable battery 23 and a motor 24 are accommodated. An output shaft 25 of the motor 24 is caused to rotate during operation. A drive element 26 may be integrally formed with or attached to the output shaft 25. The drive element 26 may engage with a driven element 61, 62 of the trimmer head engaged with the handle.

While hair cutting kits and components thereof have been described with reference to the drawings, modifications and alterations may be implemented. For illustration, providing a comb implement having comb teeth that are aligned with gaps between blade teeth, as explained with reference to FIGS. 11 to 13, offers various benefits such as robustness against manufacturing tolerances and clearances even when the comb implement is used only in association with a single trimmer head.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

The invention claimed is:

1. A hair cutting kit, comprising:

a handle;

a first trimmer head configured for releasable attachment to the handle, the first trimmer head comprising at least one first stationary blade comprising at least one row of first teeth comprising consecutive first teeth, wherein the at least one row of first teeth extends in a first direction perpendicular to central longitudinal axes of the first teeth, and the central longitudinal axes of pairs of the consecutive first teeth are spaced from each other along the first direction by a first pitch;

a second trimmer head configured for releasable attachment to the handle, the second trimmer head comprising at least one second stationary blade comprising at least one row of second teeth comprising consecutive second teeth, wherein the at least one row of second teeth extends in the first direction, central longitudinal axes of the second teeth are perpendicular to the first direction, and the central longitudinal axes of pairs of the consecutive second teeth are spaced from each other along the first direction by a second pitch;

a comb implement comprising a row of comb teeth comprising consecutive comb teeth and a mechanical interface operative for releasable attachment of the comb implement to the first trimmer head and for releasable attachment of the comb implement to the second trimmer head;

wherein the comb implement is configured such that when the comb implement is attached to the first trimmer head or the second trimmer head, the row of comb teeth extends in the first direction, pairs of the consecutive comb teeth of the row of comb teeth are separated from each other along the first direction by comb tooth gaps, mid-planes of the comb teeth are perpendicular to the first direction, and the mid-planes of the pairs of the consecutive comb teeth are spaced from each other along the first direction by a third pitch;

wherein the third pitch is equal to the first pitch multiplied by a first numerical value and the third pitch is equal to the second pitch multiplied by a second numerical value different from the first numerical value;

wherein the first numerical value and the second numerical value are each greater than 1.

2. The hair cutting kit of claim 1, wherein a ratio of the first numerical value divided by the second numerical value is about 0.5 or more, and/or wherein the ratio of the first numerical value divided by the second numerical value is about 2.0 or less.

3. The hair cutting kit of claim 1, wherein the first numerical value and the second numerical value differ from each other by 1 or 2.

4. The hair cutting kit of claim 1, wherein the first numerical value and the second numerical value are equal to or less than 5.

5. The hair cutting kit of claim 1, wherein the second pitch is smaller than the first pitch.

6. The hair cutting kit of claim 1, wherein the comb implement is configured such that, when the comb implement is attached to the second trimmer head, each of some, a majority, or all of the comb teeth overlaps a second gap between one of the pairs of the consecutive second teeth, when viewed in a viewing direction perpendicular to the first direction.

7. The hair cutting kit of claim 1, wherein the comb implement is configured such that, when the comb implement is attached to the second trimmer head, the mid-planes of some, a majority, or all of the comb teeth are aligned, when viewed in a viewing direction perpendicular to the first direction, with mid-planes of second gaps between the pairs of the consecutive second teeth, wherein the mid-planes of the second gaps are perpendicular to the first direction.

8. The hair cutting kit of claim 1, wherein the comb implement is configured such that, when the comb implement is attached to the second trimmer head, each of some, a majority, or all of the comb teeth are aligned, when viewed in a viewing direction perpendicular to the first direction, with one of the second teeth, and/or the mid-planes of each of some, a majority, or all of the comb teeth are aligned, when viewed in a viewing direction perpendicular to the first direction, with the central longitudinal axis of one of the second teeth.

9. The hair cutting kit of claim 1, wherein the comb implement is configured such that, when the first trimmer head is attached to the handle and the comb implement is attached to the first trimmer head, some, a majority, or all of the comb teeth overlap, when viewed in a viewing direction perpendicular to the first direction, ones of the first teeth, and/or the mid-planes of some, a majority, or all of the comb teeth are aligned with, when viewed in a viewing direction perpendicular to the first direction, the central longitudinal axes of ones of the first teeth.

10. The hair cutting kit of claim 1, wherein each comb tooth has a J-shaped portion.

11. The hair cutting kit of claim 10, wherein the J-shaped portion has a width measured along the first direction that is smaller than the first pitch and/or the second pitch.

12. The hair cutting kit of claim 1, wherein the first trimmer head comprises a first movable blade arranged for reciprocating movement relative to the first stationary blade, and the second trimmer head comprises a second movable blade arranged for reciprocating movement relative to the second stationary blade.

13. The hair cutting kit of claim 1, wherein the mechanical interface of the comb implement comprises an engagement structure operative for releasable engagement with engagement structures of the first trimmer head and the second trimmer head.

14. The hair cutting kit of claim 1, wherein the handle comprises an electric motor having a motor shaft and a drive element coupled to or integral with the motor shaft, the drive element being operative to drive a driven element to drive a movable blade of one of the first or the second trimmer head.

15. The hair cutting kit of claim 14, wherein the handle comprises a rechargeable battery.

16. The hair cutting kit of claim 1, wherein the first numerical value and the second numerical value are both integers.

17. A hair cutting kit, comprising:

a handle;

a trimmer head attached or releasably attachable to the handle, the trimmer head comprising at least one stationary blade comprising at least one row of blade teeth comprising consecutive blade teeth, wherein the at least one row of blade teeth extends along a first direction perpendicular to central longitudinal axes of the blade teeth, and pairs of the consecutive blade teeth are separated from each other along the first direction by gaps, wherein each gap defines a first pitch; and a comb implement comprising at least one row of comb teeth comprising consecutive comb teeth, the comb implement being configured for releasable attachment to the trimmer head or the handle and being configured such that, when the comb implement is attached, the at least one row of comb teeth extends in the first direction, pairs of the consecutive comb teeth are separated by comb tooth gaps, wherein each gap defines a second pitch, and some, a majority, or all of the comb teeth overlap, when viewed in a viewing direction perpendicular to the first direction, the gaps between the pairs of the consecutive blade teeth;

wherein the second pitch is equal to the first pitch multiplied by a first numerical value;

wherein the first numerical value is an integer greater than 1 and less than or equal to 5.

18. The hair cutting kit of claim 17, wherein the comb implement is configured such that, when the comb implement is attached, mid-planes of some, a majority, or all of the comb teeth are aligned, when viewed in a viewing direction perpendicular to the first direction, with mid-planes of the gaps between the pairs of the consecutive blade teeth, wherein the mid-planes of the comb teeth and the mid-planes of the gaps are perpendicular to the first direction.

19. The hair cutting kit of claim 17, wherein the first numerical value is an integer.

* * * * *